(12) United States Patent
Kato

(10) Patent No.: US 7,555,949 B2
(45) Date of Patent: Jul. 7, 2009

(54) ANGULAR VELOCITY MEASURING DEVICE

(75) Inventor: Yoshitaka Kato, Kanazawa (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 535 days.

(21) Appl. No.: 10/597,492

(22) PCT Filed: Apr. 6, 2005

(86) PCT No.: PCT/JP2005/006756
§ 371 (c)(1),
(2), (4) Date: Jul. 27, 2006

(87) PCT Pub. No.: WO2005/098359
PCT Pub. Date: Oct. 20, 2005

(65) Prior Publication Data
US 2008/0229822 A1 Sep. 25, 2008

(30) Foreign Application Priority Data
Apr. 7, 2004 (JP) .............................. 2004-113403

(51) Int. Cl.
G01P 9/00 (2006.01)
G01P 15/08 (2006.01)

(52) U.S. Cl. .............. 73/504.12; 73/504.03; 73/504.04; 73/510; 73/514.02

(58) Field of Classification Search .............. 73/504.12, 73/495, 499, 504.03, 510, 511, 514.02, 514.35
See application file for complete search history.

(56) References Cited

U.S. PATENT DOCUMENTS
5,321,991 A * 6/1994 Kalotay .................. 73/861.357

(Continued)

FOREIGN PATENT DOCUMENTS
JP 01-172262 A 7/1989

(Continued)

OTHER PUBLICATIONS

Official Communication issued in the corresponding International Application No. PCT/JP2005/006756, mailed on Jul. 19, 2005.

(Continued)

*Primary Examiner*—Hezron Williams
*Assistant Examiner*—Samir M Shah
(74) *Attorney, Agent, or Firm*—Keating & Bennett, LLP

(57) ABSTRACT

An angular velocity measuring device includes an angular having a mounting surface on which a velocity detection element, element-side drive electrodes and element-side detection electrodes are provided and a ground electrode is disposed between the drive electrodes and the detection electrodes. On the top surface of a multilayer substrate, substrate-side drive electrodes and substrate-side detection electrodes are provided and a ground electrode is disposed between the drive electrodes and the detection electrodes. The electrodes of the angular velocity detection element are connected to the electrodes of the multilayer substrate and the two ground electrodes are arranged to face each other. Furthermore, on the top surface of the multilayer substrate, drive wirings connected to the drive electrodes are provided and, inside the multilayer substrate, detection wirings connected to the detection electrodes are provided. Ground wirings sandwiching the detection wirings in the thickness direction are disposed in the multilayer substrate.

20 Claims, 20 Drawing Sheets

U.S. PATENT DOCUMENTS

| | | | |
|---|---|---|---|
| 5,777,228 A * | 7/1998 | Tsuboi et al. | 73/579 |
| 6,134,962 A * | 10/2000 | Sugitani | 73/504.16 |
| 6,747,393 B2 * | 6/2004 | Kikuchi et al. | 310/321 |
| 7,400,078 B2 * | 7/2008 | Takahashi et al. | 310/348 |
| 2001/0008089 A1 * | 7/2001 | Abe et al. | 73/504.16 |
| 2004/0145281 A1 * | 7/2004 | Kikuchi et al. | 310/367 |
| 2006/0197414 A1 * | 9/2006 | Takahashi et al. | 310/348 |
| 2008/0028855 A1 * | 2/2008 | Kano et al. | 73/504.12 |

FOREIGN PATENT DOCUMENTS

| | | | |
|---|---|---|---|
| JP | 04-094747 A | | 3/1992 |
| JP | 05-331502 A | | 12/1993 |
| JP | 10-2741 A | | 1/1998 |
| JP | 10-54723 A | | 2/1998 |
| JP | 10-300475 A | | 11/1998 |
| JP | 2001-201348 A | | 7/2001 |
| JP | 2002-48553 A | | 2/2002 |

OTHER PUBLICATIONS

Official Communication issued in corresponding Japanese Patent Application No. 057780 of Heisei 8 [1996], dated Oct. 10, 2006.

* cited by examiner

ANGULAR VELOCITY MEASURING DEVICE

BACKGROUND OF THE INVENTION

1. Field of the Invention

The present invention relates to an angular velocity measuring device preferably used for detecting an angular velocity, for example.

2. Description of the Related Art

Generally, an angular velocity measuring device in which an angular velocity detection element and a signal processing element are mounted is known (see Japanese Unexamined Patent Application Publication No. 10-300475, for example). In this case, the angular velocity detection element is defined by a vibrating body arranged so as to be vibrated in first and second axial directions out of three axes at right angles to each other, a driving element for making the vibrating body vibrate in the first axial direction by a drive signal, and a displacement detecting element for detecting a displacement in the second axial direction of the vibrating body and outputting a detection signal when an angular velocity is applied around the third axis while the vibrating body is vibrated in the first axial direction. Furthermore, a drive wiring and a detection wiring connected to the driving element and the displacement detecting element of the angular velocity detection element, respectively, are contained in the substrate, and the angular velocity detection element and the signal processing element are connected through the wiring.

In the angular velocity measuring device according to such a related technology, when a drive signal is inputted from the signal processing element to the angular velocity detection element through a drive wiring, the driving element makes the vibrating body vibrate in the first axial direction on the basis of the drive signal. In this state, when an angular velocity is applied around the third axis, a Coriolis force operates on the vibrating body in the second axial direction. In this way, since the vibrating body is displaced in the second axial direction in accordance with the angular velocity, the displacement detecting element detects the amount of displacement of the vibrating body in the second axial direction as a change of electrostatic capacitance, etc., and outputs a detection signal in accordance with the angular velocity. Then, the signal processing element receives the detection signal from the displacement detecting element through the detection wiring and calculates the angular velocity by performing various calculation processes concerning the detection signal.

Since the detection wiring has a high impedance on the order of megaohms ($\times 10^6 \Omega$), in the above-described related technology, crosstalk occurs due to a coupling capacitance between the drive wiring and the detection wiring and there are cases in which drive signals mix into a detection signal. At this time, since both the drive wiring and the detection wiring according to the related technology are disposed on the surface of the substrate, sufficient shielding cannot be provided around the detection wiring having a high impedance and the coupling capacitance between the drive wiring and the detection wiring cannot be reduced. Accordingly, in the related technology, the drive wirings and the detection wirings transmit two drive signals and detection signals having different signs, and the balance of coupling capacitance between the drive wirings and the detection wirings is adjusted to cancel crosstalk.

However, in such a construction according to the related technology, since the coupling capacitance between the drive wiring and the detection wiring has a large absolute value, a small amount of coupling capacitance (a few fF, for example) remains because of variations of the wirings, etc. At this time, when a weak angular velocity is detected, for example, since the detection signal is also very weak, even if the crosstalk is caused by a very tiny coupling capacitance a very large output at rest is generated in comparison with the detection sensitivity. As a result, there is a problem in that the deviation of output at rest and offset temperature drift characteristics are greatly affected.

Furthermore, in the related technology, in order to reduce the coupling capacitance, the drive wirings are arranged so as to be symmetrical to the two detection wirings. However, in this case, the lead-out of the wiring is limited, and the size of the mounting surface including the wiring is increased, and there is a problem in that the freedom of design of the angular velocity detection element, the signal processing element, and other elements, is reduced.

Moreover, in the related technology, since the lead-out of the wiring is limited and simultaneously the freedom of design of the elements is reduced, the angular velocity detection element is difficult to be flip-chip mounted on the substrate. That is, in order to flip-chip mount the angular velocity detection element on the substrate, the electrodes (wirings) must be disposed on the substrate side at high density in accordance with the electrodes on the element side and the wirings must be symmetrical in order to reduce the coupling capacitance. In contrast with this, in the related technology, since the lead-outs of the wirings are limited, high density wirings that are symmetrically arranged cannot be achieved. As a result, in the related technology, since an angular velocity detection element is mounted on the substrate using wire bonding, the common use in the mounting processing of components is impossible and the productivity is reduced, and crosstalk mixes through the coupling capacitance between the wires and there is a problem in that deviation of output at rest and offset temperature drift characteristics are deteriorated.

SUMMARY OF THE INVENTION

In order to overcome the problems described above, preferred embodiments of the present invention provide an angular velocity measuring device in which detection wirings having a high impedance are effectively shielded, restrictions in the lead-out of wirings and the disposition of elements are eliminated, and the mounting area is reduced.

In order to solve the above-described problems, a preferred embodiment of the present invention includes an angular velocity measuring device including a substrate, an angular velocity detection element having a vibrating body disposed in the substrate so as to be vibrated in the first and second axial directions of three axial directions corresponding to three axes at right angles to each other, a driving element for vibrating the vibrating body in the first axial direction using a drive signal, and a displacement detecting element for detecting displacement in the second axial direction of the vibrating body and outputting a detection signal when an angular velocity is applied around the third axis while the vibrating body is vibrated in the first axial direction, drive wiring disposed in the substrate and connected to the driving element of the angular velocity detection element, detection wiring disposed in the substrate and connected to the displacement detecting element of the angular velocity detecting element, and a signal processing element disposed in the substrate and connected to the drive wiring and the detection wiring.

In preferred embodiments of the present invention, the substrate is preferably a multilayer substrate including a plurality of insulation layers. The detection wiring is disposed between two insulation layers inside the multilayer substrate.

Low-impedance wiring facing the detection wiring is arranged at a location different from the detection wiring in the thickness direction of the multilayer substrate. The angular velocity detection element includes an element-side drive electrode connected to the driving element, an element-side detection electrode connected to the displacement detecting element, and an element-side low-impedance electrode arranged between the element-side drive electrode and the element-side detection electrode for cutting off the coupling between the element-side drive electrode and the element-side detection electrode disposed on the mounting surface side to the multilayer substrate. On the top surface of the multilayer substrate, a substrate-side drive electrode connected to the drive wiring and facing the element-side drive electrode, a substrate-side detection electrode connected to the detection wiring and facing the element-side detection electrode, and a substrate-side low-impedance electrode arranged between the substrate-side drive electrode and the substrate-side detection electrode for cutting off the coupling between the substrate-side drive electrode and the substrate-side detection electrode are provided. The angular velocity detection element is mounted on the top surface of the multilayer substrate using metal bumps. The element-side drive electrode and the substrate-side drive electrode are connected using metal bumps. The element-side detection electrode and the substrate-side detection electrode are connected using metal bumps. The element-side low-impedance electrode and the substrate-side low-impedance electrode are connected at a low-impedance reference potential. The element-side low-impedance electrode and the substrate-side low-impedance electrode are arranged to at least partially face each other.

When constructed in this manner, since a detection wiring is disposed inside a multilayer substrate and a low-impedance wiring facing the detection wiring at a location different from the detection wiring in the thickness direction is provided in the multilayer substrate, a high-impedance detection wiring is shielded using the low-impedance wiring. Accordingly, a drive signal is prevented from mixing into a detection signal between the drive wiring and the detection wiring and, as a result, deviation of output is prevented at rest and offset temperature drift characteristics are improved.

Furthermore, since a multilayer substrate is used as the substrate in which an angular velocity detection element, and other suitable element, are mounted, in comparison with the case in which a single-layer substrate is used as in the related technology, the restriction of lead-out to the drive wiring, detection wiring, and other elements, is eliminated and the degree of freedom of design of an element is increased. As a result, the mounting area including the wiring is reduced and the sized of the device, as a whole, can be reduced.

Moreover, since the wiring is freely led by using a multilayer substrate, the electrodes for connecting an angular velocity detection element are disposed with high density on the surface of the multilayer substrate, and the drive wiring and the detection wiring can be arranged so as to be symmetrical, for example. Accordingly, the angular velocity detection element can be flip-chip mounted on the multilayer substrate and, in comparison with the case where wire-bonding mounting is performed, the productivity and detection sensitivity are improved.

Furthermore, since an element-side low-impedance electrode is arranged between an element-side drive electrode and an element-side detection electrode on the mounting surface of an angular velocity detection element, the coupling between the element-side drive electrode and the element-side detection electrode is cut off by the element-side low-noise electrode. Here, when the angular velocity detection element is flip-chip mounted on the multilayer substrate using metal bumps, the element-side drive electrode and the substrate-side drive electrode are connected to each other so as to face each other, and the element-side detection electrode and the substrate-side detection electrode are also connected to each other so as to face each other. Accordingly, since the element-side low-impedance electrode is disposed between the substrate-side drive electrode and the substrate-side detection electrode, the coupling between the substrate-side drive electrode and the substrate-side detection electrode is also cut off by the element-side low-impedance electrode. As a result, the occurrence of crosstalk between these electrodes is prevented and offset temperature drift characteristics are improved.

On the other hand, since a substrate-side low-impedance electrode is arranged between the substrate-side drive electrode and the substrate-side detection electrode on the top surface of the multilayer substrate, the coupling between the substrate-side drive electrode and the substrate-side detection electrode is cut off by the substrate-side low-impedance electrode. Here, when an angular velocity detection element is flip-chip mounted on the multilayer substrate using metal bumps, the element-side drive electrode and the substrate-side drive electrode are connected to each other so as to face each other and the element-side detection electrode and the substrate-side detection electrode are also connected to each other so as to face each other. Accordingly, since the substrate-side low-impedance electrode is disposed between the element-side drive electrode and the element-side detection electrode, the coupling between the element-side drive electrode and the element-side detection electrode is also cut off by the substrate-side low-impedance electrode. As a result, the occurrence of crosstalk between the electrodes is prevented and offset temperature drift characteristics are improved.

Moreover, in the preferred embodiments of the present invention, when an angular velocity detection element is flip-chip mounted on the multilayer substrate using metal bumps, the element-side low-impedance electrode and the substrate-side low-impedance electrode at least partially face each other. At this time, the opposite portion where the element-side low-impedance electrode and the substrate-side low-impedance electrode face each other is disposed between the substrate-side drive electrode and the substrate-side detection electrode and also disposed between the element-side drive electrode and the element-side detection electrode. Accordingly, by using the opposite portion of the two low-impedance electrodes, the coupling between the substrate-side drive electrode and the element-side detection electrode is cut off and the coupling between the element-side drive electrode and the substrate-side detection electrode is also cut off. As a result, the occurrence of crosstalk between the electrode on the substrate side and the electrode on the element side is prevented and offset temperature drift characteristics are improved.

Furthermore, another preferred embodiment of the present invention includes a multilayer substrate including a plurality of insulation layers. The detection wiring is disposed between two insulation layers inside the multilayer substrate. Low-impedance wiring facing the detection wiring is disposed at a location different from the detection wiring in the thickness direction in the multilayer substrate. The angular velocity detection element includes an element-side drive electrode disposed on the mounting surface side to the multilayer substrate and connected to the driving element, an element-side detection electrode connected to the displacement detecting element, and an element-side low-impedance electrode enclosing the element-side drive electrode or the element-side detection electrode for cutting off the coupling between the element-side drive electrode and the element-side detection electrode. On the top surface of the multilayer substrate, a substrate-side drive electrode connected to the drive wiring and facing the element-side drive electrode, a substrate-side detection electrode connected to the detection wiring and facing the element-side detection electrode, and a substrate-side low-impedance electrode enclosing the substrate-side drive electrode or the substrate-side detection electrode for cutting off the coupling between the substrate-side drive electrode and the substrate-side detection electrode are provided. The angular velocity detection element is mounted on the top surface of the multilayer substrate using metal bumps. The element-side drive electrode and the substrate-side drive electrode are connected busing metal bumps. The element-side detection electrode and the substrate-side detection electrode are connected using metal bumps. The element-side low-impedance electrode and the substrate-side low-impedance electrode are connected at a low-impedance reference potential. And the element-side low-impedance electrode and the substrate-side low-impedance electrode are arranged to at least partially face each other between the element-side drive electrode and the element-side detection electrode.

With this configuration, a high-impedance detection wiring is shielded by using a low-impedance wiring. Accordingly, a drive signal is prevented from mixing with a detection signal between the drive wiring and the detection wiring, and, as a result, deviation output at rest is prevented and offset temperature drift characteristics is improved.

Furthermore, since a multilayer substrate is used in which an angular velocity detection element, and other suitable elements, are mounted, the degree of freedom of design of an element is improved As a result, the mounting area, including the wiring, is reduced and the size of the device, as a whole, can be reduced.

Furthermore, since the wiring is freely arranged by using a multilayer substrate, the drive electrode and the detection electrode can be disposed at free locations on the surface of the multilayer substrate and the mounting surface of the angular velocity detection element. Accordingly, the angular velocity detection element is flip-chip mounted on the multilayer substrate, and, in comparison with the case where wire bonding mounting is performed, the productivity and detection sensitivity are improved.

Furthermore, since an element-side low-impedance electrode enclosing an element-side drive electrode or an element-side detection electrode is provided on the mounting surface of an angular velocity detection element, the coupling between the element-side drive electrode and the element-side detection electrode is cut off by the element-side low-impedance electrode. On the other hand, since a substrate-side low-impedance electrode enclosing a substrate-side drive electrode or an substrate-side detection electrode is provided on the surface of a multilayer substrate, the coupling between the substrate-side drive electrode and the substrate-side detection electrode is cut off by the substrate-side low-impedance electrode.

Moreover, in the preferred embodiments of the present invention, when an angular velocity detection element is flip-chip mounted on a multilayer substrate using metal bumps, an element-side low-impedance electrode and a substrate-side low-impedance electrode at least partially face each other between the element-side drive electrode and the element-side detection electrode. At this time, the opposite portion at which the element-side low-impedance electrode and the substrate-side low-impedance electrode face each other is arranged between the element-side drive electrode and the element-side detection electrode and also arranged between the substrate-side drive electrode and the substrate-side detection electrode. Accordingly, by using the opposite portions of the two low-impedances, the coupling between the element-side detection electrode and the element-side detection electrode is cut off and the coupling between the element-side drive electrode and the substrate-side detection electrode is also cut off. As a result, the occurrence of crosstalk between the electrode on the substrate side and the electrode on the element side is prevented and offset temperature drift characteristics is improved.

In another preferred embodiment of the present invention, the opposite portion, at which the element-side low-impedance electrode and the substrate-side low-impedance electrode face each other, may enclose the element-side detection electrode and the substrate-side detection electrode.

In this manner, since the opposite portion of the two low-impedance electrodes enclose both detection electrodes on the element side and the substrate side, the coupling between the detection electrodes and the element-side drive electrode and substrate-side drive electrode is more securely cut off. As a result, the occurrence of crosstalk between the drive electrode and the detection electrode is prevented and offset temperature drift characteristics is improved.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, an angular velocity measuring device according to preferred embodiments of the present invention is described with reference to the accompanied drawings.

Figure 1:
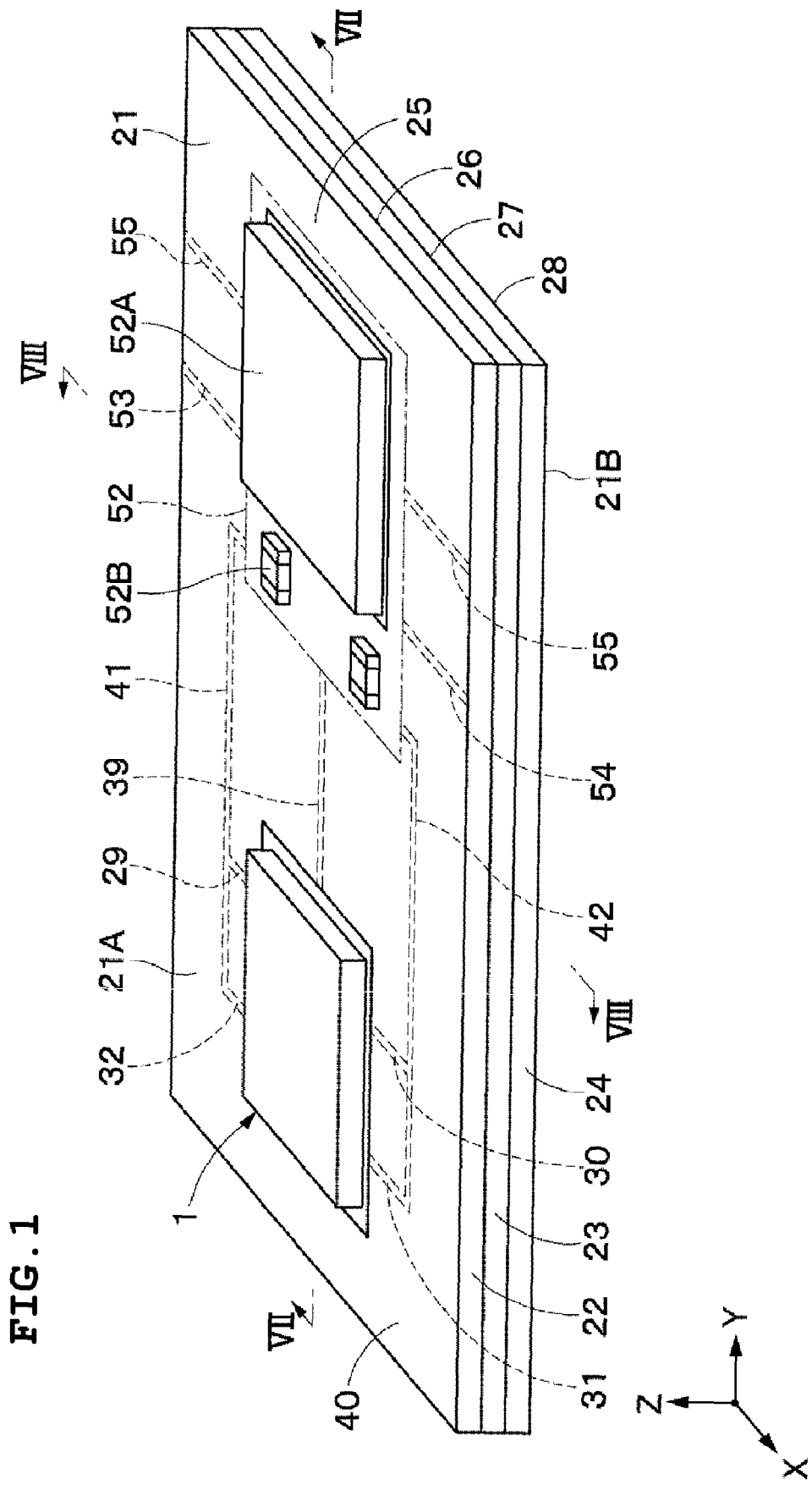
FIG. 1 is a perspective view showing an angular velocity measuring device according to a first preferred embodiment of the present invention.
Figure 2:
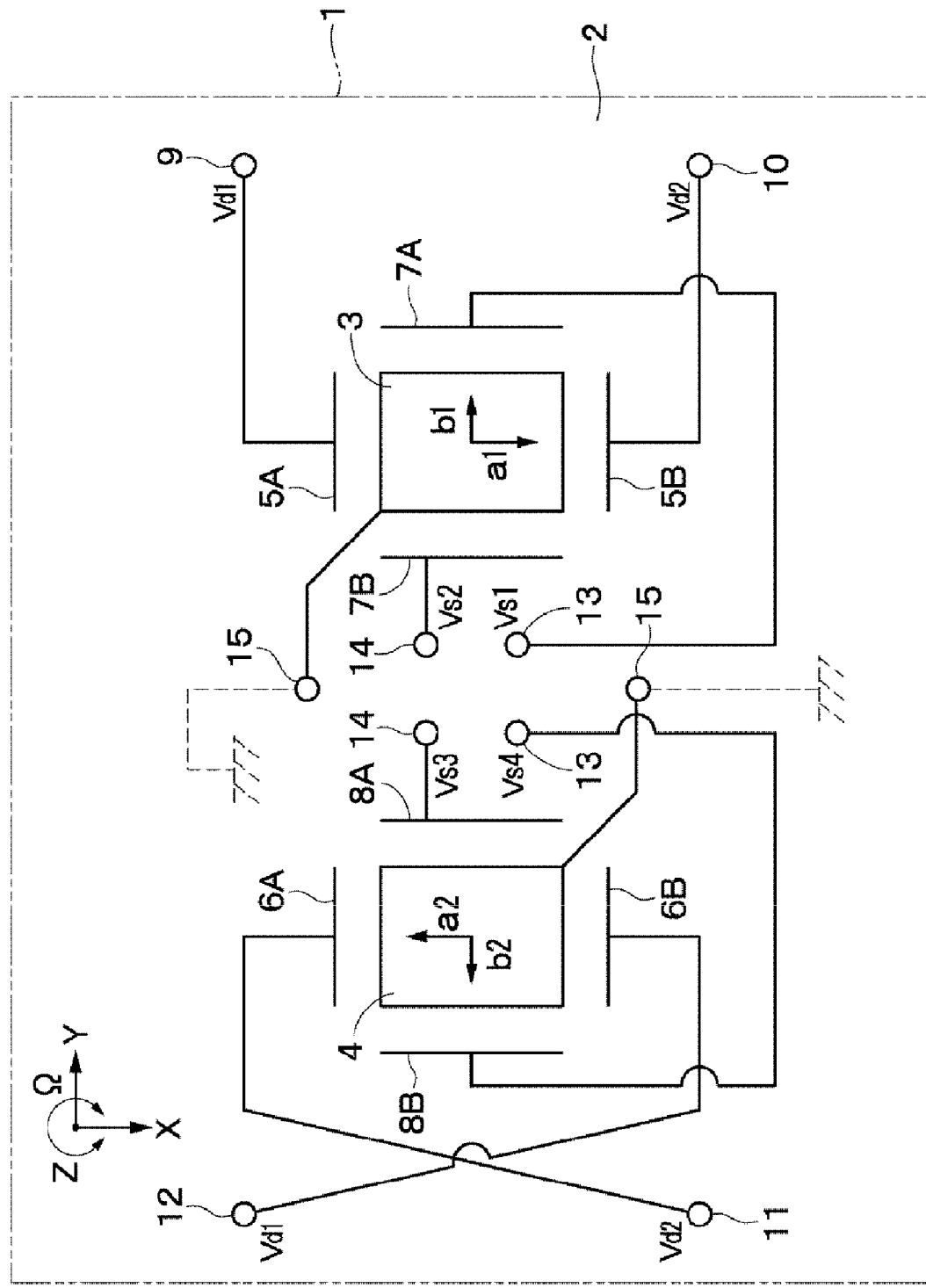
FIG. 2 is a block diagram showing an angular velocity detection element in FIG. 1.

FIGS. 1 to 9 show a first preferred embodiment of the present invention. In the drawings, reference numeral 1 represents an angular velocity detection element including a vibration-type gyro element mounted on a multilayer substrate 21 to be described later. As shown in FIG. 2, the angular velocity detection element 1 includes vibrating bodies 3 and 4 which can be displaced in first and second axial directions (X-axis direction and Y-axis direction) parallel to an element substrate out of three axes, drive portions 5A, 5B, 6A, and 6B as driving elements to drive the vibrating bodies 3 and 4 in X-axis direction, and detection portions 7A, 7B, 8A, and 8B as displacement detecting elements to detect displacement of the vibrating bodies 3 and 4 in Y-axis direction.

Here, the element substrate 2 is preferably formed by using a glass substrate, or other suitable material, for example. Furthermore, the vibrating bodies 3 and 4, drive portions 5A, 5B, 6A, and 6B, and detection portions 7A, 7B, 8A, and 8B are formed such that fine processing, such as etching, is performed to a silicon substrate anodic bonded on the element substrate 2, for example. Furthermore, the vibrating bodies 3 and 4 are supported so as to be displaced in the X-axis direction and Y-axis direction using beams (not illustrated), and the drive portions 5A, 5B, & A, and 6B and the detection portions 7A, 7B, 8A, and 8B are defined by comb-shaped electrodes, for example.

Figure 3:
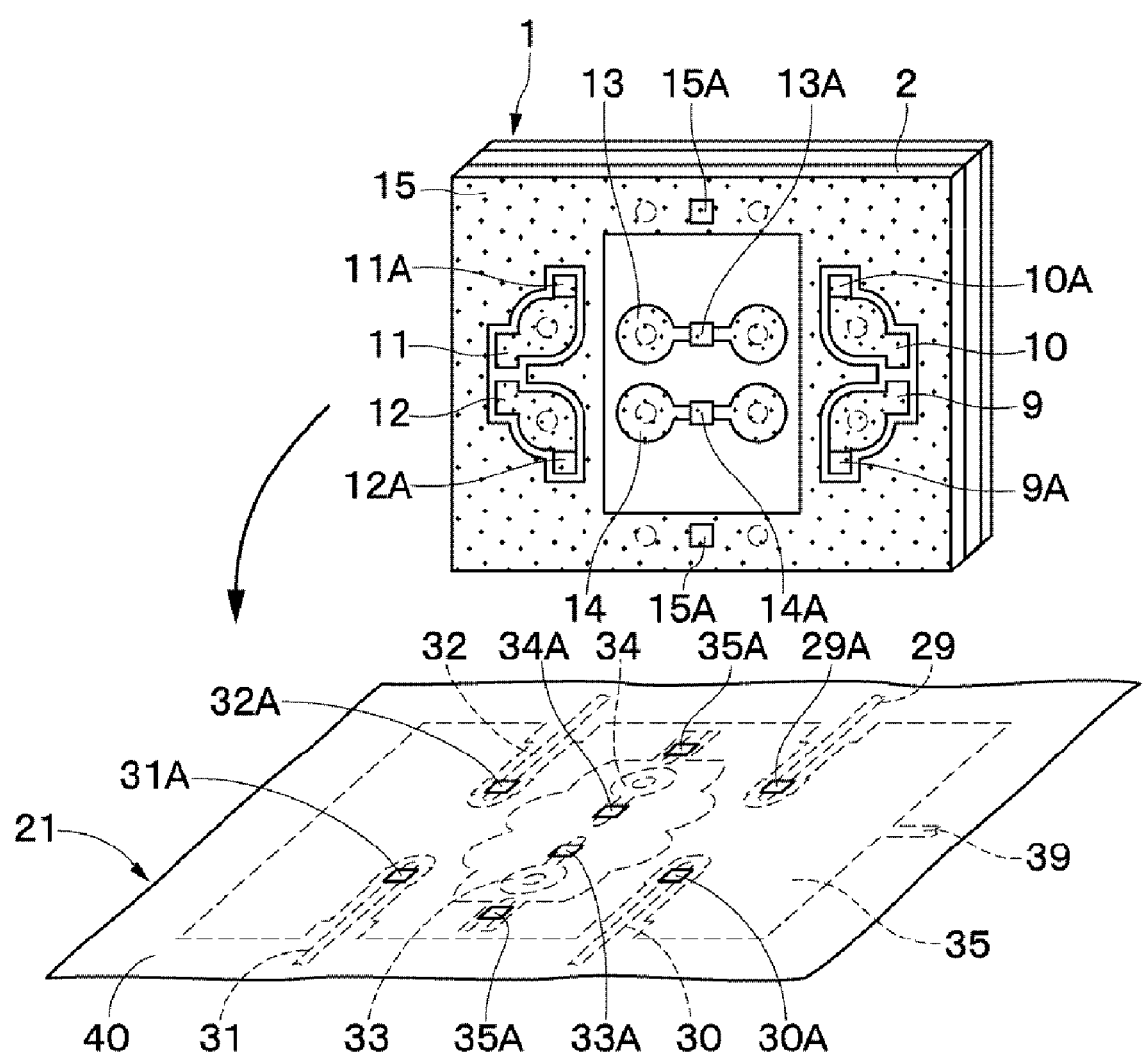
FIG. 3 is an enlarged exploded perspective view showing the angular velocity detection element and a multilayer substrate in FIG. 1.
Figure 4:
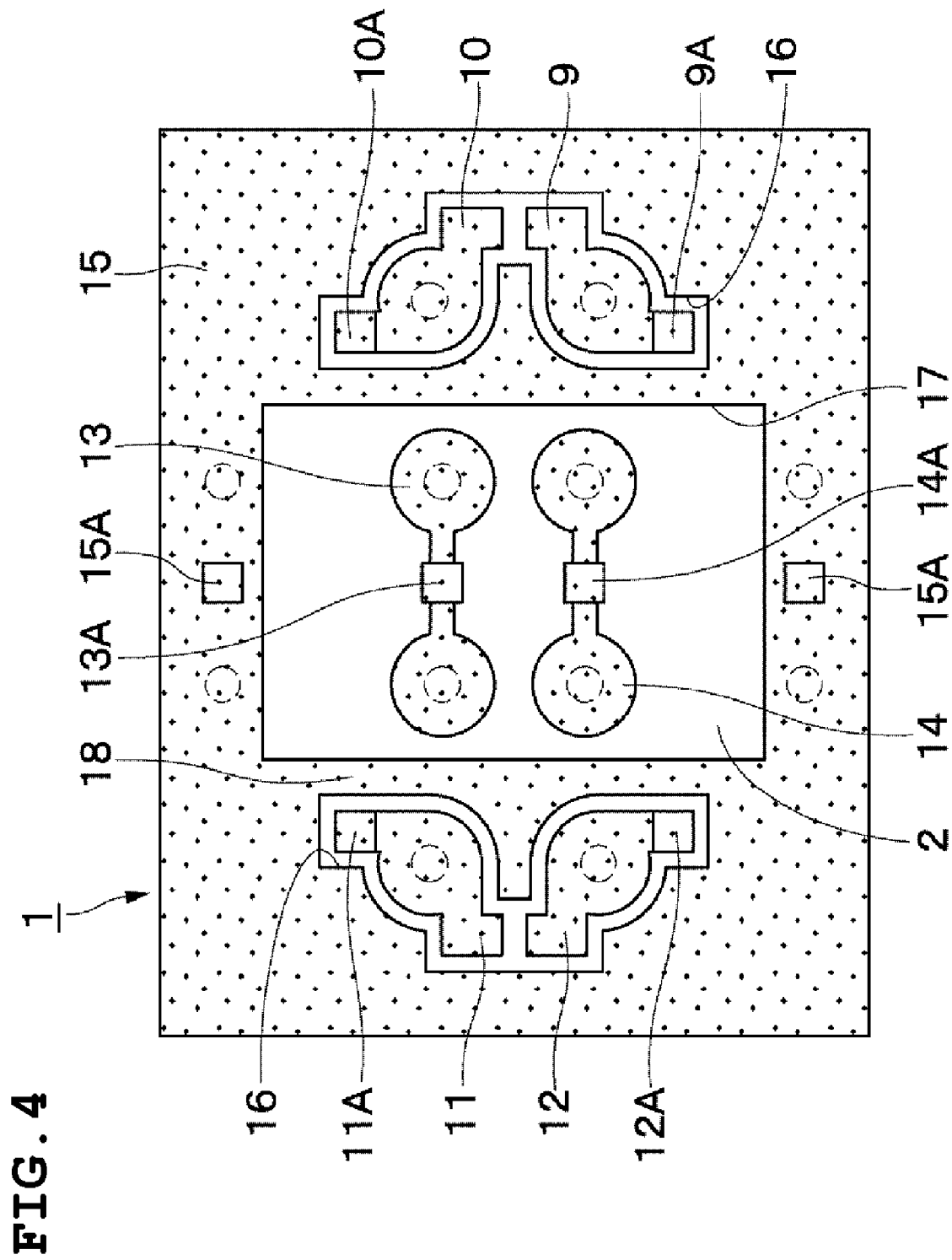
FIG. 4 is a bottom view showing the angular velocity detection element in FIG. 3.
Figure 5:
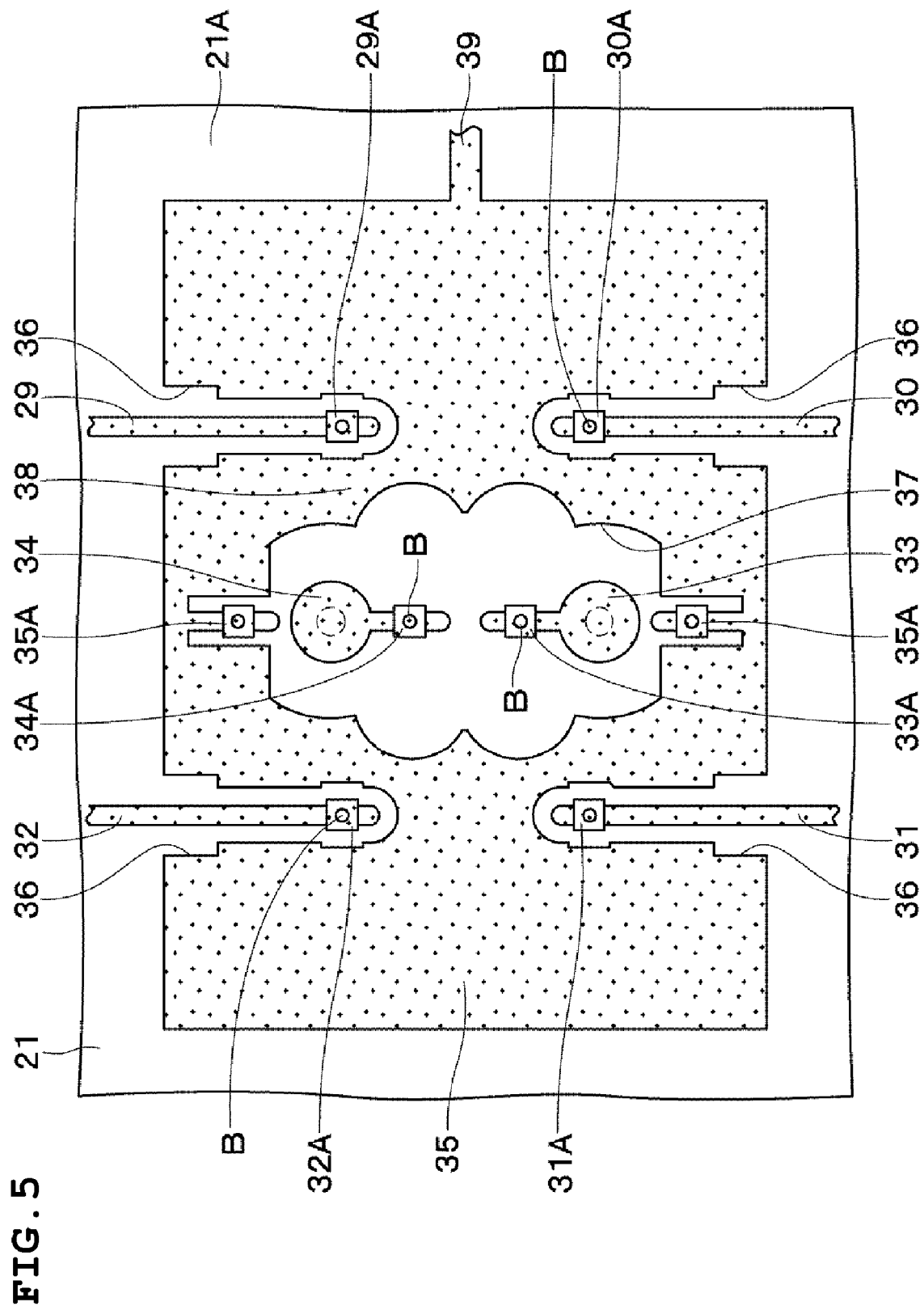
FIG. 5 is a top view showing the multilayer substrate in FIG. 3, in which a resist film is removed.
Figure 6:
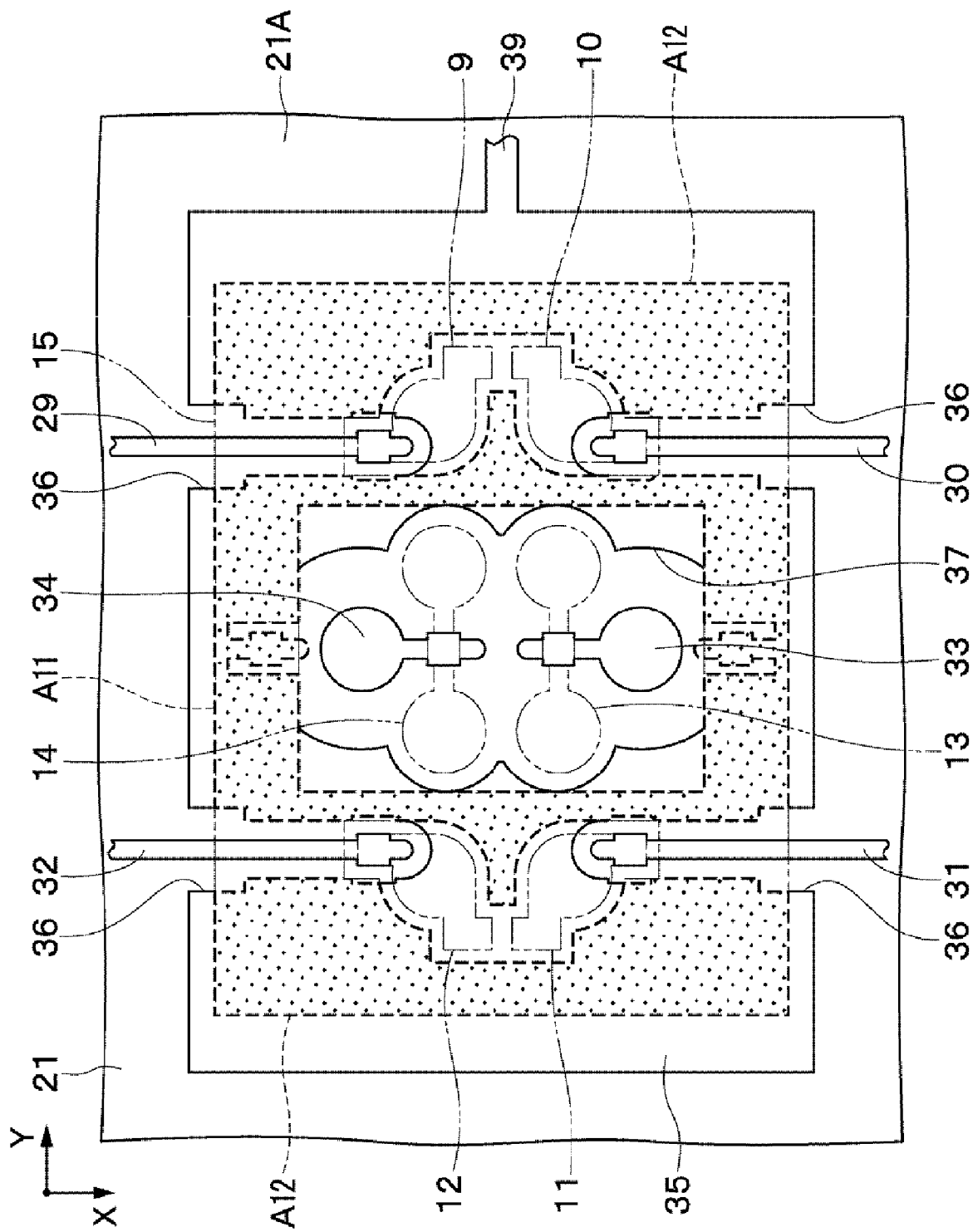
FIG. 6 is an illustration showing the portion in which a ground electrode of the angular velocity detection element and a ground electrode of the multilayer substrate of the first preferred embodiment face each other.

Moreover, as shown in FIGS. 2 to 4, element-side drive electrodes 9 to 12, element-side detection electrodes 13 and 14, and ground electrodes as element-side low-impedance electrodes are provided on the back surface (mounting surface) of the element substrate 2. Then, the drive portions 5A, 5B, 6A, 6B are connected to the element-side drive electrodes 9, 10, 11, and 12 by using through-holes, respectively, and the detection portions 7B and 8A are connected to the element-side detection electrode 14. The ground electrode 15 is connected to a ground electrode 35 on the side of a multilayer substrate 21 to be described later. Thus, the ground electrode 15 is maintained at a ground potential as a low-impedance reference potential, and the vibrating bodies 3 and 4 are connected to the ground electrode 15.

In this manner, when drive signals Vd1 and Vd2 of voltages having opposite phases to each other are applied to the drive portions 5A and 5B, electrostatic attraction acts between the vibrating body 3 and the drive portions 5A and 5B in accordance with the drive signals Vd1 and Vd2 and the vibrating body 3 is vibrated in the X-axis direction. Then, when an angular velocity $\Omega$ in the Z-axis direction perpendicular to the element substrate 2 is applied to the element substrate 2 in this state, a Coriolis force acts on the vibrating body 3 and the vibrating body 3 is displaced (vibrated) in the Y-axis direction. At this time, since the electrostatic capacitance between the detection portions 7A and 7B and the vibrating body 3 changes, the detection portions 7A and 7B output a voltage in accordance with the electrostatic capacitance as detection signals Vs1 and Vs2.

In the same manner, drive signals Vd2 and Vd1 having opposite phases to each other are also applied to the drive portions 6A and 6B, when an angular velocity $\Omega$ in the Z-axis direction is applied to the vibrating body 4, the vibrating body 4 is displaced (vibrated) in the Y-axis direction. Accordingly, the detection portions 8A and 8B output a voltage in accordance with the electrostatic capacitance between the detection portions 8A and 8B and the vibrating body 4 as detection signals Vs3 and Vs4.

Moreover, since the drive signal Vd1 is input to the drive portions 5A and 5B and the drive signal Vd2 is input to the drive portions 5B and 5A, the vibrating bodies 3 and 4 are vibrated in opposite directions to each other in the X-axis direction. Furthermore, since the vibrating bodies 3 and 4 have substantially the same structure, when the same angular velocity $\Omega$ acts on the vibrating bodies 3 and 4, the amount of change of the detection signals Vs1 and Vs4 of the detection portions 7A and 7B is the same and the amount of change of the detection signals Vs2 and Vs3 of the detection portions 7B and 7A is also the same. On the other hand, when the same acceleration in the Y-axis direction acts on the vibrating bodies 3 and 4, the amount of change of the detection signals Vs1 and Vs4 of the detection portions 7A and 7B have the same value of opposite signs to each other, and the amount of change of the detection signals Vs2 and Vs3 of the detection portions 7B and 7A also has the same value of opposite signs to each other. Accordingly, when the detection portions 7A and 7B are connected to the element-side detection electrode 13 and the detection portions 7B and 8A are connected to the element-side detection electrode 14, the acceleration components are removed from the detection signals Vs1 to Vs4 and only the acceleration components are output.

Here, the element-side drive electrodes 9 to 12 and element-side detection electrodes 13 and 14 are preferably configured to be island-shaped. Furthermore, as shown in FIGS. 3 and 4, the element-side drive electrodes 9 and 10 and the element-side drive electrodes 11 and 12 are disposed on the back surface (side) of the element substrate 2 and arranged so as to be separated from each other in the Y-axis direction. On the other hand, the element-side detection electrodes 13 and 14 are disposed in the central portion of the element substrate 2. Furthermore, the ground electrode 15 is provided in a portion excluding the surrounding portion (vicinity) of the electrodes 9 to 14 on the back surface of the element substrate 2 so as to be insulated from the element-side drive electrodes 9 to 12 and the element-side detection electrodes 13 and 14. Accordingly, the ground electrode 15 is disposed on the entire area of the back surface of the element substrate 2. However, in the ground electrode 15, an opening 16 is provided at the location of each of the element-side drive electrodes 9 and 10 and the element-side drive electrodes 11 and 12 and an opening 17 is provided at the location of the element-side detection electrodes 13 and 14. Thus, a frame-shaped frame portion 18 disposed around the opening 17 of the ground electrode 15 is disposed between the element-side detection electrodes 13 and 14 and the element-side drive electrodes 9 to 12 so as to include the element-side detection electrodes 13 and 14.

Then, the electrodes 9 to 15 are connected to electrodes 29 to 35 on the side of a multilayer substrate 21 to be described later.

Figure 7:
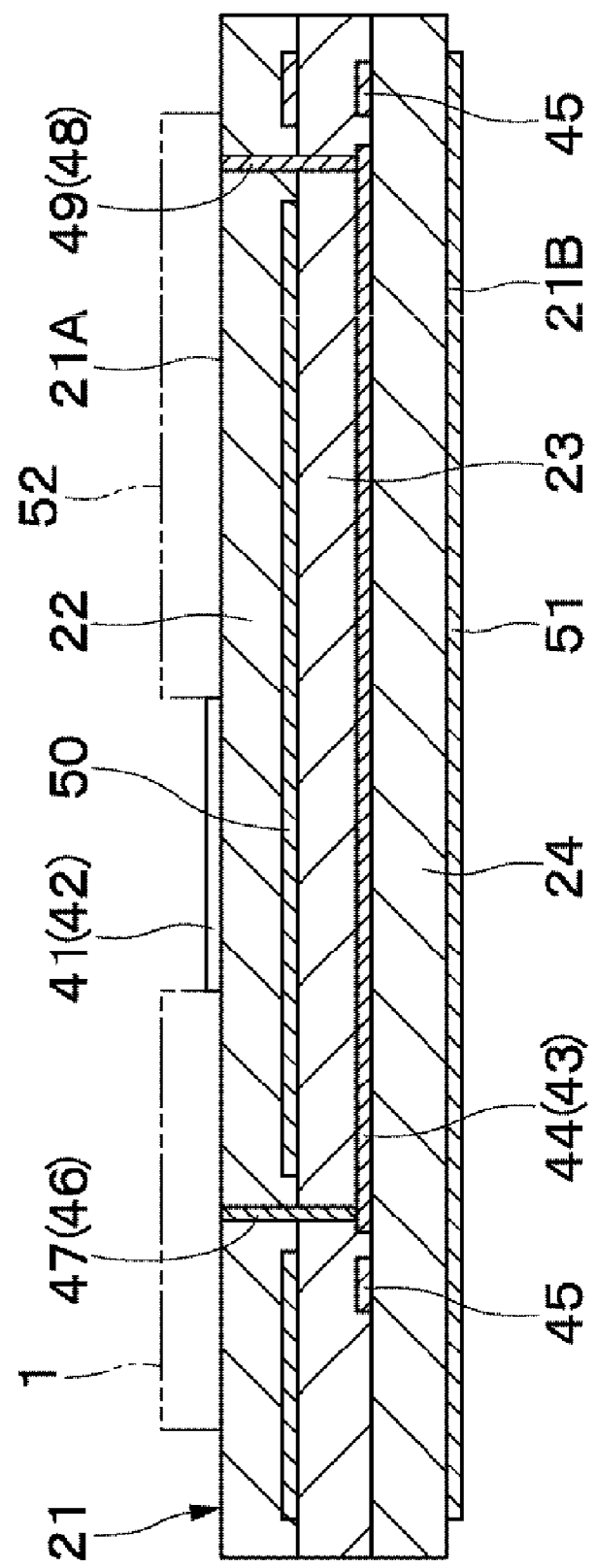
FIG. 7 is a sectional view of the angular velocity measuring device taken on line VII-VII of FIG. 1.
Figure 8:
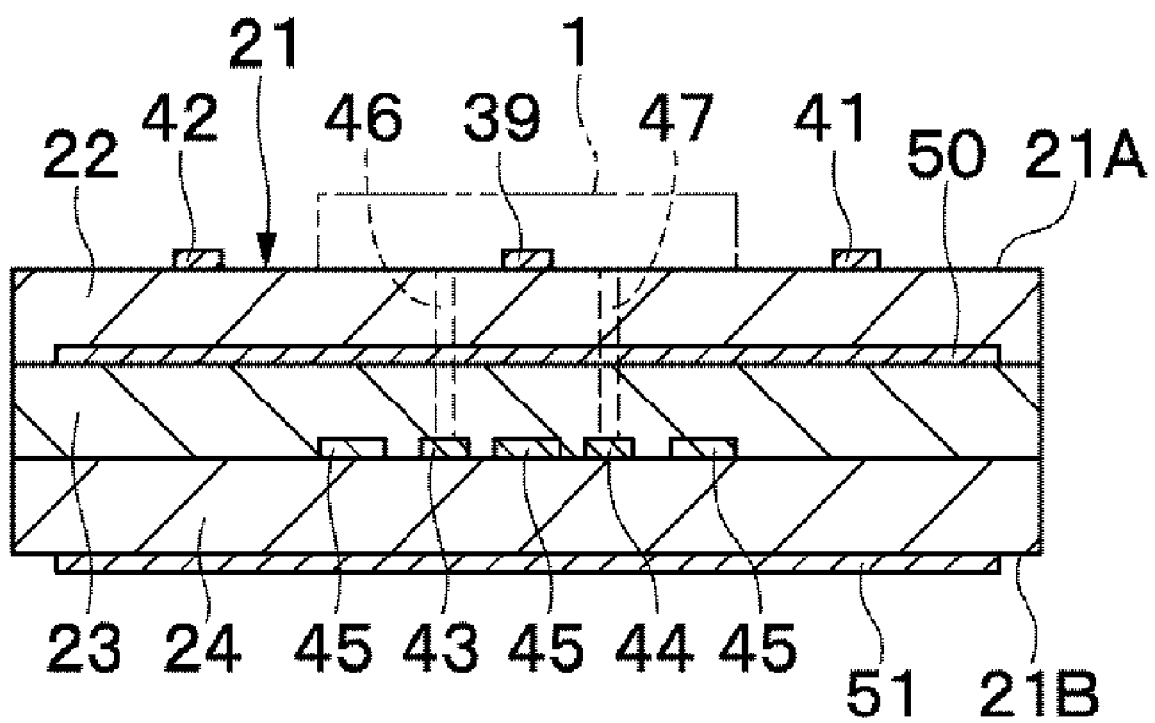
FIG. 8 is a sectional view of the angular velocity measuring device taken on line VIII-VIII of FIG. 1.
Figure 9:
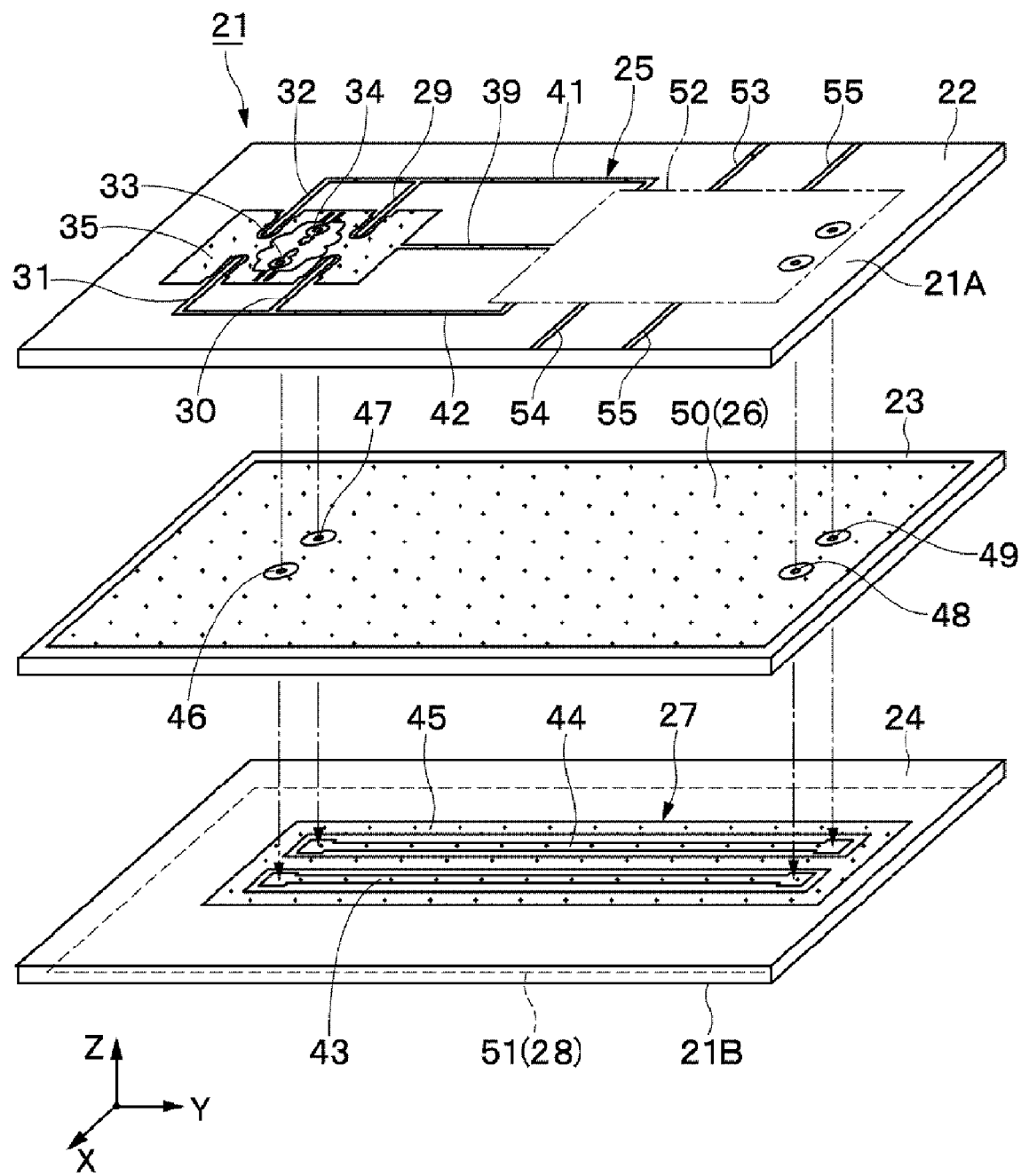
FIG. 9 is an exploded perspective view showing the multilayer substrate in FIG. 1.

Reference numeral 21 represents a multilayer substrate in which the angular velocity detection element 1 is mounted. As shown in FIGS. 7 to 9, the multilayer substrate 21 includes three insulation layers 22 to 24 preferably made of ceramic material of alumina, or other suitable ceramic material, for example, and these insulation layers 22 to 24 are laminated to each other. Then, a first electrode layer 25 is provided on the surface 21A of the multilayer 21, a second electrode layer 26 is provided between the insulation layers 22 and 23, a third electrode layer 27 is provided between the insulation layers 23 and 24, and a fourth electrode layer 28 is provided on the back surface 21B of the multilayer substrate 21.

Reference numerals 29 to 32 represent belt-shaped substrate-side drive electrodes. The substrate-side drive electrodes 29 to 32 are disposed at locations facing the element-side drive electrodes 9 to 12 and extend from the central portion of the multilayer substrate 21 to the outer periphery portion. Then, the substrate-side drive electrodes 29 and 30 and the substrate-side drive electrodes 31 and 32 are arranged so as to be separated from each other in the Y-axis direction, the substrate-side drive electrodes 29 and 32 are connected to a drive wiring 41 to be described later, and the substrate-side drive electrodes 30 and 31 are connected to a drive wiring 42 to be described later.

Reference numerals 33 and 34 represent island-shaped substrate-side detection electrodes contained on the surface 21A of the multilayer substrate 21. The substrate-side detection electrodes 33 and 34 are disposed at locations facing the element-side detection electrodes 13 and 14 and arranged between the substrate-side drive electrodes 29 and 30 and the substrate-side electrodes 31 and 32. Then, the substrate-side detection electrodes 33 and 34 are connected to detection wirings 43 and 44 provided inside the multilayer substrate 21 via through holes 46 and 47 to be described later.

Reference numeral 35 represents a ground electrode as a substrate-side low-impedance electrode provided on the surface 21A of the multilayer substrate 21. The ground electrode 35 is provided in the entire area facing the angular velocity detection element 1 on the surface 21A of the multilayer 21. However, the ground electrode 35 is provided in a portion excluding the periphery (vicinity) of the electrodes 29 to 34 so as to be isolated from the substrate-side drive electrodes 29 to 32 and the substrate-side detection electrodes 33 and 34. Accordingly, in the ground electrode 35, notches 36 extending along the electrodes 29 to 32 are provided at locations of the substrate-side drive electrodes 29 to 32 extending toward the outside of the multilayer substrate 21, and an opening 37 is provided at the location of the substrate-side detection electrodes 33 and 34. Thus, a frame-shaped frame portion 38 around an opening 37 of the ground electrode 35 is disposed between the substrate-side detection electrodes 33 and 34 and the substrate-side drive electrodes 29 to 32 so as to enclose the substrate-side detection electrodes 33 and 34.

Furthermore, when the angular velocity detection element 1 is flip-chip mounted on the multilayer substrate 21, the ground electrode 35 on the side of the multilayer substrate 21 and the ground electrode 15 on the side of the angular velocity detection element 1 lie one on top of another (face each other) and the opposite portions A11 and A12 (portions enclosed by a broken line in FIG. 6) of the ground electrodes 15 and 35 are provided. At this time, the opposite portion A11 of the ground electrodes 15 and 35 preferably has a frame shape so as to enclose the element-side detection electrodes 13 and 14 and also enclose the substrate-side detection electrodes 33 and 34. Thus, the opposite portion A11 of the ground electrodes 15 and 35 is disposed between the element-side drive electrodes 9 to 12 and the element-side electrodes 13 and 14.

Furthermore, the opposite portion A12 of the ground electrodes 15 and 35 are disposed on both sides in the Y-axis direction of the facing-each-other portion A11 and extend in the X-axis direction. Then, the element-side detection electrodes 33 and 34 are sandwiched between the facing-each-other portion A12 and the opposite portion A11 of the ground electrodes 15 and 35.

Furthermore, the ground electrode 35 is connected to a ground wiring 39 extending for a signal processing circuit portion 52 to be described later. Thus, the ground electrode 35 is connected to the ground electrode (not illustrated) of the signal processing circuit portion 52 and maintained at a ground potential as a low-impedance reference potential.

Moreover, a resist film 40 is provided over substantially the entire surface of the multilayer substrate 21. Then, the resist film 40 covers the electrodes 29 to 35. However, the electrode pads 29A to 35A of the electrodes 29 to 35 are exposed. In this manner, the electrodes 29 to 35 are connected to the electrode pads 9A to 15A of the angular velocity detection element 1 using metal bumps B made of a conductive metal material such as gold, for example, provided on the electrode pads 29A to 35A, and the angular velocity detection element 1 is flip-chip mounted on the multilayer substrate 21.

Reference numerals 41 and 42 represent drive wirings provided on the surface 21a of the multilayer substrate 21. As shown in FIGS. 1 to 9, the drive wirings 41 and 42 extend in the Y-axis direction of the multiplayer substrate 21, connect the substrate-side drive electrodes 29 to 32 and the signal processing circuit portion 52, and define the first electrode layer 25 together with the electrodes 29 to 35 and the ground wiring 39. Here, the drive wiring 41 is connected to the substrate-side drive electrodes 29 to 32. On the other hand, the drive wiring 42 is provided on the opposite side from the drive wiring 41 so as to sandwich the ground wiring 39, and connected to the substrate-side drive electrodes 30 and 31. In this manner, the drive wirings 41 and 42 supply the drive signals Vd1 and Vd2 having opposite phases to each other to be applied from the signal processing circuit portion 52 to the substrate-side drive electrodes 29 to 32, and cause the vibrating bodies 3 and 4 to vibrate in the X-axis direction.

Reference numerals 43 and 44 represent detection wirings provided inside the multilayer substrate 21. The detection wirings 43 and 44 are arranged between the insulation layers 23 and 24, and extend substantially parallel to each other and in the Y-axis direction so as to extend from the angular velocity detection element 1 to the signal processing circuit portion 52. Furthermore, a ground electrode 45 as a low-impedance wiring is provided between the insulation layers 23 and 24 so as to enclose each of the detection wirings 43 and 44. Here, the ground electrode 45 is connected to the ground electrode (not illustrated) of the signal processing circuit portion 52 via through-holes. Then, the detection wirings 43 and 44 define the third electrode layer 27 together with the ground electrode 45.

Furthermore, in the detection wirings 43 and 44, one terminal is connected to the substrate-side detection electrodes 33 and 34 via through-holes 46 and 47 and the other terminal is connected to the signal processing circuit portion 52 via through-holes 48 and 49.

Reference numeral 50 represents a ground electrode as a low-impedance wring contained between the insulation layers 22 and 23. The ground electrode 50 faces substantially the entire length of the detection wirings 43 and 44 and covers substantially the entire area on the surface side of the insulation layer 23. However, the ground electrode 50 is provided in the area in which the surrounding of the through-holes 46 to 49 is excluded such that the ground electrode 50 may be insulated from the detection wirings 43 and 44. Furthermore, the ground electrode 50 is connected to the ground electrode (not illustrated) of the signal processing circuit portion 52 and defines the second electrode layer 26. Then, the ground electrode 50 is disposed between the drive wirings 41 and 42 and the detection wirings 43 and 44 and reduces a coupling capacitance therebetween.

Reference numeral 51 represents a ground electrode as a low-impedance wiring provided on the back surface 21B of the multilayer substrate 21. The ground electrode 51 faces substantially the entire length of the detection wirings 43 and 44 and covers substantially the entire area of the back surface 21B. The ground electrode 51 is connected to the ground electrode (not illustrated) of the signal processing circuit portion 52 via through-holes (not illustrated), and defines the fourth electrode layer 28. Then, the ground electrode 50 reduces the coupling capacitance between the drive wirings 41 and 42 and the detection wirings 41 and 42 and the detection wirings 43 and 44 and prevents outside noise (noise signal) from mixing into the detection wirings 43 and 44.

Reference numeral 52 represents a signal processing circuit portion provided on the surface 21A of the multilayer substrate 21. The signal processing circuit portion 52 is defined by a bare chip IC52A, a circuit part 52B made up of various active elements and passive elements, and other suitable elements, the bare chip IC52A is flip-chip mounted, for example, and the circuit part 52B is SMD mounted (surface mounted) using a reflow soldering process.

Furthermore, the signal processing circuit portion 52 is connected to the drive wirings 41 and 42, the detection wirings 43 and 44, the ground wiring 39, and the ground electrodes 45, 50, and 51, and also connected to ground wiring 53, a power supply wiring 54, and an output signal wiring 55. Then, the signal processing circuit portion 52 is connected to the external ground via the ground wiring 53, and a drive power supply voltage is supplied to the signal processing circuit portion 52 via the ground wiring 53. In this manner, the signal processing circuit portion 52 supplies drive signals Vd1 and Vd2 having opposite phases to each other to the angular velocity detection element 1 through the drive wirings 41 and 42, and simultaneously receives detection signals Vs1 to Vs4 from the angular velocity detection element 1 through the detection wirings 43 and 44 and outputs an output signal Vo in accordance with an angular velocity Ω by performing various computations. Furthermore, the signal processing circuit portion 52 outputs the output signal Vo to the outside through the output signal wiring 55.

The angular velocity measuring device according to the present preferred embodiment has the above-described structure. Next, the operation is described.

First, when the signal output circuit portion 52 outputs drive signals having opposite phases to each other to the drive wirings 41 and 42, the drive signals Vd1 and Vd2 are applied to the drive portions 5A, 5B, 6A, and 6B of the angular velocity detection element 1 through the drive electrodes 9 to 12, and 29 to 32. Thus, an electrostatic attraction acts on the vibrating bodies 3 and 4 and the vibrating bodies 3 and 4 are vibrated in the direction of arrows a1 and a2 in FIG. 2 along the X axis. When an angular velocity Ω acts around the Z axis in this state, since a Coriolis force shown by Formula 1 acts on the vibrating bodies 3 and 4, the vibrating bodies 3 and 4 are displaced and vibrated in the direction of arrows b1 and b2 in FIG. 2 along the Y axis in accordance with an angular velocity Ω.

$$F = 2 \times M \times \Omega \times v$$ Formula 1

Where
M=mass of vibrating bodies 3 and 4
Ω=angular velocity around Z axis
V=velocity in the direction of X axis of vibrating bodies 3 and 4

At this time, since the electrostatic capacitance between the detection portions 7A, 7B, 8A, and 8B and the vibrating bodies 3 and 4 changes in accordance with the displacement in the direction of the Y axis of the vibrating bodies 3 and 4, the detection portions 7A, 7B, 8A, and 8B output detection signals Vs1 to Vs4 in accordance with the capacitance change. When these detection signals Vs1 to Vs4 are synthesized in the detection electrodes 13 and 14, acceleration components are removed and the detection signals Vs1 to Vs4 are input to the signal processing circuit portion 52 through the detection electrodes 33 and 34 and the detection wirings 43 and 4. Accordingly, the signal processing circuit portion 52 performs signal processing of synchronous detection of detection signals Vs1 to Vs4 to detect an angular velocity Ω and output an output signal Vo to the outside.

At the same time, the drive signals Vd1 and Vd2 and the detection signals Vs1 to Vs4 include relatively low frequencies of tens kHz and the coupling capacitance between the drive wirings 41 and 42 and the detection wirings 43 and 44 is very small (about a few fF, for example). Accordingly, since crosstalk between the drive signals Vd1 and Vd2 and the detection signals Vs1 to Vs4 is very small, the mixture of signals due to crosstalk is negligible except for the angular velocity measuring device. In the angular velocity detection element 1, since the displacement of the vibrating bodies 3 and 4 due to a Coriolis force is very small, the detection signals Vs1 to Vs4 have a small value as compared to the drive signals Vd1 and Vd2. Furthermore, since the phase of crosstalk and the phase of detection are equal to each other, the crosstalk cannot be eliminated by the detection. Accordingly, even when the drive signals Vd1 and Vd2 slightly mix with the detection signals Vs1 to Vs4, detection of output at rest and offset temperature drift characteristics are deteriorated.

Then, in a related technology, although the drive wiring and the detection wiring are formed so as to be symmetrical in order to offset the crosstalk between the drive signal and the detection signal, in this case, the freedom of design of a lead-in and lead-out wire is limited, and also, when the angular velocity detection element is mounted on a substrate as it is displaced, the coupling capacitance between the drive wiring and the detection wiring changes, and there is a problem in that the crosstalk cannot be fully offset.

On the contrary, according to the present preferred embodiment, since the detection wirings 43 and 44 are provided inside the multilayer substrate 21 and the ground electrodes 50 and 51 for covering the detection wirings 43 and 44 are provided at a different location from the detection wirings 43 and 44 in the thickness direction, the detection wirings 43 and 44 of a high impedance is shielded by using the ground electrodes 50 and 51. Accordingly, the drive signals Vd1 and Vd2 are prevented from mixing with the detection signals Vs1 to Vs4 between the drive wirings 41 and 42 and the detection wirings 43 and 44, and, as a result, deviation of output at rest is prevented and offset temperature drift characteristics are improved.

Furthermore, since the angular velocity detection element 1 is mounted on the multilayer substrate 21, in comparison with the case where a substrate of a single layer is used as in the related technology, the restrictions of lead-in and lead-out wirings are eliminated in the drive wirings 41 and 42 and the detection wirings 43 and 44, and the freedom of design of the element 1 is increased. As a result, the mounting area for the wirings 41 to 44 is reduced and the size of the device, as a whole, is reduced.

Moreover, since the wirings 41 to 44 can be freely set by using the multilayer substrate 21, for example, the drive wirings 41 and 42 and the detection wirings 43 and 44 are arranged so as to be symmetrical and the coupling capacitance between the drive wiring 41 and the detection wiring 43 can be set so as to be substantially equal to the coupling capacitance between the drive wiring 42 and the detection wiring 44. Accordingly, even when the drive wirings 41 and 42 and the detection wiring 43 are coupled, the crosstalk between a drive signal and a detection signal is offset and the detection sensitivity is improved.

Furthermore, since the wirings 41 to 44 can be freely set by using the multilayer substrate 21, the electrodes 29 to 35 for connection to the angular velocity detection element 1 can be disposed with high density on the surface 21A of the multilayer substrate 21, and the substrate-side drive electrodes 29 to 32 and the substrate-side detection electrodes 33 and 34 can be disposed at free locations so as to face the element-side drive electrodes 9 to 12 and the element-side detection electrodes 13 and 14 on the surface 21A of the multilayer substrate 21. Accordingly, the angular velocity detection element 1 can be flip-chip mounted on the multilayer substrate 21. As a result, in comparison with the case in which wire-bonding mounting is performed, productivity is improved, and simultaneously, the mixture of noise from wires is eliminated and the detection sensitivity is improved.

In particular, in the present preferred embodiment, since the ground electrode 50 is disposed between the drive wirings 41 and 42 and the detection wirings 43 and 44, the drive wirings 41 and 42 and the detection wirings 43 and 44 can be isolated from each other by using the ground electrode 50 and the occurrence of crosstalk between them is securely prevented.

Furthermore, the element-side drive electrodes 9 to 12 and the element-side detection electrodes 13 and 14 are provided on the mounting surface of the angular velocity detection element 1, the substrate-side drive electrodes 29 to 32 and the substrate-side detection electrodes 33 and 34 are provided on the surface 21A of the multilayer substrate 21, the element-side drive electrodes 9 to 12 and the substrate-side drive electrodes 29 to 32 are connected, and the element-side detection electrodes 13 and 14 and the substrate-side detection electrodes 33 and 34 are connected, and thus, the angular velocity detection element 1 is flip-chip mounted on the multilayer substrate 21. Accordingly, for example, the bare chip IC52A, and other elements, defining the signal processing circuit portion 52 are mounted and simultaneously the angular velocity detection element 1 can be mounted and, in comparison with the case where wire-bonding mounting is performed, the productivity is further improved.

Furthermore, since the ground electrode 15 disposed between the element-side drive electrodes 9 to 12 and the element-side detection electrodes 13 and 14 is provided on the mounting surface of the angular velocity detection element 1, the coupling between the element-side drive electrodes 9 to 12 and the element-side detection electrodes 13 and 14 is cut off from each other by the ground electrode 15.

Furthermore, when the angular velocity detection element 1 is flip-chip mounted on the multilayer substrate 21, since the element-side drive electrodes 9 to 12 and the substrate-side drive electrodes 29 to 32 are connected so as to face each other and the element-side detection electrodes 13 and 14 and the substrate-side detection electrodes 33 and 34 are connected so as to face each other, the ground electrode 15 is disposed between the substrate-side drive electrodes 29 to 32 and the substrate-side detection electrodes 33 and 34. Accordingly, the coupling between the substrate-side drive electrodes 29 to 32 and the substrate-side detection electrodes 33 and 34 is also cut off from each other by the ground electrode 15. As a result, the occurrence of crosstalk between the electrodes 29 to 32 and the electrodes 33 and 34 is prevented and offset temperature drift characteristics are improved.

Moreover, since the ground electrode 35 disposed between the substrate-side drive electrodes 29 to 32 and the substrate-side detection electrodes 33 and 34 is provided on the surface 21A of the multilayer substrate 21, the coupling between the substrate-side drive electrodes 29 to 32 and the substrate-side detection electrodes 33 and 34 is cut off by the ground electrode 35. Accordingly, due to the multiplication effect between the angular velocity detection element 1 and the ground electrode 15, the coupling between the drive electrodes 9 to 12 and 29 to 32 and the detection electrodes 13, 14, 33, and 34 is securely cut off and the effect of the cut-off of crosstalk is increased.

Furthermore, in the related technology, when an angular velocity detection element is mounted on a substrate so as to be displaced, the coupling capacitance between the electrode pad on the substrate side and the electrode pad of the angular velocity detection element changes, and there is a tendency for crosstalk to occur. However, in the present preferred embodiment, since the ground electrodes 15 and 35 are provided between the drive electrodes 9 to 12, and 29 to 32 and the detection electrodes 13, 14, 33, and 34, even if the angular velocity detection element 1 is mounted on the multilayer substrate 21 so as to be displaced, the opposite portion A11 of the ground electrodes 15 and 35 is still disposed between the drive electrodes 9 to 12, and 29 to 32 and the detection electrodes 13, 14, 33, and 34. As a result, the coupling between the drive electrodes 9 to 12, and 29 to 32 and the detection electrodes 13, 14, 33, and 34 is cut off by using the opposite portion A11 of the ground electrodes 15 and 35 and the occurrence of crosstalk is prevented.

Furthermore, since the angular velocity detection element 1 is flip-chip mounted on the multilayer substrate 21 using metal bumps B, the substrate-side drive electrodes 29 to 32 and the element-side drive electrodes 9 to 12 are very close to each other and, for example, both face each other with a gap of about tens μm therebetween. In the same manner, the substrate-side detection electrodes 33 and 34 also face the element-side detection electrodes 13 and 14 so as to be close to each other. Accordingly, when the electrodes 9 to 14, and 29 to 34 are arranged at high density, since the drive electrodes 9 to 12, and 29 to 32 are close to the detection electrodes 13, 14, 33, and 34, there is a tendency for crosstalk to occur between the substrate-side drive electrodes 29 to 32 and the element-side detection electrodes 13 and 14, and there is a tendency for crosstalk to occur between the element-side drive electrodes 9 to 12 and the substrate-side detection electrodes 33 and 34.

However, in the present preferred embodiment, when the angular velocity detection element 1 is flip-chip mounted on the multilayer substrate 21, the ground electrodes 15 and 35 partially face the element-side drive electrodes 9 to 12 and the element-side detection electrodes 13 and 14. At this time, the opposite portion A11 at which the ground electrodes 15 and 35 face each other is disposed between the element-side drive electrodes 9 to 12 and the element-side detection electrodes 13 and 14, and also disposed between the substrate-side drive electrodes 29 to 32 and the substrate-side detection electrodes 33 and 34. Accordingly, the coupling between the substrate-side electrodes 29 to 32 and the element-side detection electrodes 13 and 14 is cut off by using the opposite portion A11 of the ground electrodes 15 and 35, and simultaneously, the coupling between the electrode-side drive electrodes 9 to 12 and the substrate-side detection electrodes 33 and 34 is also cut off. As a result, the occurrence of crosstalk between the electrodes 29 to 34 on the side of the multilayer substrate 21 and the electrodes 9 to 14 on the side of the angular velocity detection element 1 is prevented and offset temperature drift characteristics is improved.

In particular, in the present preferred embodiment, the opposite portions A11 of the ground electrodes 15 and 35 enclose the element-side detection electrodes 13 and 14, and also enclose the substrate-side detection electrodes 33 and 34. Accordingly, the coupling between the detection electrodes 13, 14, 33, and 35 and the element-side drive electrodes 9 to 12 and the substrate-side drive electrodes 29 to 32 is securely cut off. As a result, the occurrence of crosstalk between the drive electrodes 9 to 12, and 29 to 33 and the detection electrodes 13, 14, 33, and 34 is securely prevented.

Moreover, since the drive electrodes 9 to 12, and 29 to 32 are sandwiched between the opposite portions A11 and A12 of the ground electrodes 15 and 35, the drive signals Vd1 and Vd2 are enclosed around the drive electrodes 9 to 12, and 29 to 32 and the effect of suppressing crosstalk is increased.

Furthermore, the through-holes 46 and 47 arranged at a portion at which the angular velocity detection element 1 is mounted for connecting the substrate-side detection electrodes 33 and 34 and the detection wirings 43 and 44 are provided in the multilayer substrate 21. Accordingly, the substrate-side electrodes 33 and 34 may be disposed at a location facing the element-side detection electrodes 13 and 14 of the angular velocity detection element 1, and the freedom of setting the other electrodes of the substrate-side drive electrodes 29 to 32 is increased. Furthermore, since the substrate-side detection electrodes 33 and 34 are connected to the detection wirings 43 and 44 provided inside the multilayer substrate 21 at a location at which the angular velocity detection element 1 is mounted, in comparison with the case where the connection to the signal processing circuit portion 52 is performed on the side of the surface 21A of the multilayer substrate 21, the mixing of outside noise is prevented and the detection sensitivity of the angular velocity $\Omega$ is increased.

Furthermore, since the length dimension of the substrate-side detection electrodes 33 and 34 (the length dimension between the detection portions 7A, 7B, 8A, and 8B and the detection wirings 43 and 44) is shortened, the coupling of the substrate-side detection electrodes 33 and 34 to the drive electrodes 29 to 32 is suppressed.

Moreover, since the vibrating bodies 3 and 4 of the angular velocity detection element 1, drive portions 5A, 5B, 6A, and 6B and detection portions 7A, 7B, 8A, and 8B are formed by fine processing of a silicon material, the angular velocity detection element 1 can be made smaller. Furthermore, since the detection wirings 43 and 44 are provided inside the multilayer substrate 21 and the freedom of arrangement of electrodes on the side of the multilayer substrate 21 is improved, even if the electrodes 9 to 15 for external connection of the angular velocity detection element 1 are disposed at high density to enable size reduction, the angular velocity detection element 1 can be flip-chip mounted on the multilayer substrate 21.

Furthermore, since the detection portions 7A, 7B, 8A, and 8B of the angular velocity detection portion 1 detect the electrostatic capacitance in accordance with the displacement of the vibrating bodies 3 and 4, there is a tendency that the detection signals Vs1 to Vs4 are likely to be deteriorate in accordance with the coupling capacitance between the detection wirings 43 and 44 and the drive wirings 41 and 42. On the contrary, in the present preferred embodiment, since the detection wirings 43 and 44 are disposed inside the multilayer substrate 21 and the detection wirings 43 and 44 are covered by the ground electrodes 45, 50, and 51, the coupling capacitance between the detection wirings 43 and 44 and the drive wirings 41 and 42 is reduced and the occurrence of crosstalk is suppressed.

Moreover, since the insulation layers 22 to 24 of the multilayer substrate 21 are formed by using insulating ceramic material of alumina, for example, in the case where a glass substrate is used as the element substrate 2 of the angular velocity detection element 1, in comparison with the case where a resin material is used for the insulation layers 22 to 24, the difference of thermal expansion coefficients is reduced and the change of the detection sensitivity and output at rest is significantly reduced.

Figure 10:
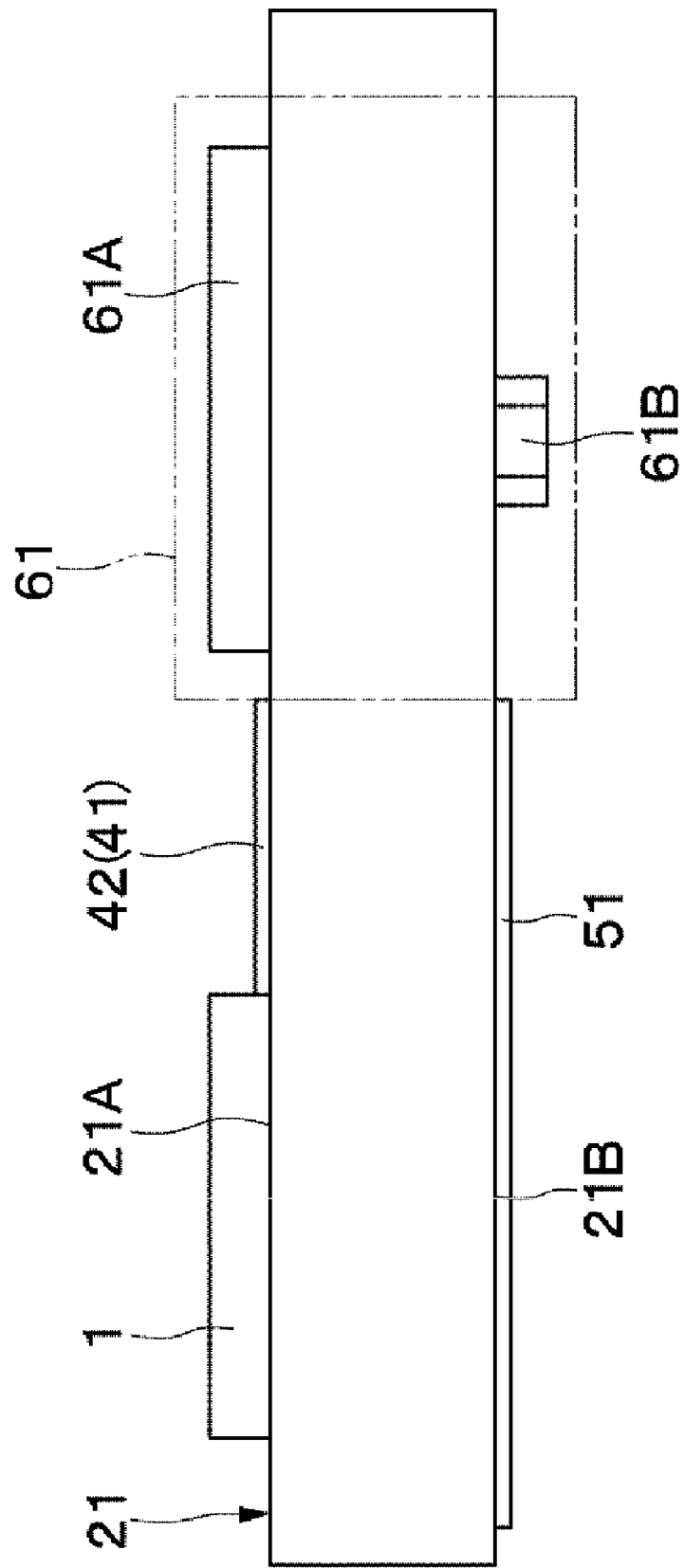
FIG. 10 is a front view showing an angular velocity measuring device according to a second preferred embodiment of the present invention.

Next, FIG. 10 shows a second preferred embodiment of the present invention, and the present preferred embodiment includes a bare chip IC to be flip-chip mounted out of circuit parts that are provided on the surface side, in which an angular velocity detection element is provided, of a multilayer substrate, and the circuit parts to be surface mounted are provided on the back surface side of the multilayer substrate. Moreover, in the present preferred embodiment, the same reference numerals are given to the same or similar components as in the first preferred embodiment, and their descriptions are omitted.

Reference numeral 61 represents a signal processing circuit portion as a signal processing element provided on the surface 21A of the multilayer substrate 21. The signal processing circuit portion 61 is defined by a bare chip IC 61A, a circuit part 61B, and other suitable elements, in the same manner as in the first preferred embodiment. Then, the bare chip IC 61A is disposed on the side of the surface 21A of the multilayer substrate 21 in the same manner as the angular velocity detection element 1 and flip-chip mounted, and the circuit part 61B is disposed on the side of the back surface 21B of the multilayer substrate 21 different from the angular velocity detection element 1 and SMD mounted (surface mounted) by solder reflowing. Furthermore, the signal processing circuit portion 61 is connected to the drive wirings and detection wirings.

Thus, in the present preferred embodiment, substantially the same operation-effects as in the first preferred embodiment are obtained. In the present preferred embodiment in particular, since the bare chip IC 61A which is to be flip-chip mounted in the signal processing circuit portion 11 is disposed on the surface 21A of the multilayer substrate 21 in the same manner as the angular velocity detection element 1, the bare chip IC 61A and the angular velocity detection element 1 can be mounted together on the multilayer substrate 21 and the productivity is improved. Furthermore, since the circuit part 61B to be surface mounted is disposed on the side of the back surface 21B of the multilayer substrate 21 different from the angular velocity detection element 1, when the circuit part 61B is reflow-soldered, the mounting surface (electrodes, pads, etc.) of the angular velocity detection element 1 and bare chip IC 61A is prevented from being contaminated. As a result, defective joining is prevented in the flip-chip mounting and the yield and reliability of the mounting are improved.

Next, FIGS. 11 to 15 show a third preferred embodiment of the present invention includes drive wirings that are disposed inside a multilayer substrate, and substrate-side drive electrodes and substrate-side detection electrodes are enclosed by a ground electrode. Moreover, in the present preferred embodiment, the same reference numerals are given to the same or similar components as in the first preferred embodiment, and their descriptions are omitted.

Reference numerals 71 to 74 represent island-shaped element-side drive electrodes provided on the back surface (mounting surface) of an element substrate 2. The element-side drive electrodes 71 to 74 are connected to drive portions 5A, 5B, 6A, and 6B substantially in the same manner as the element-side drive electrodes 9 to 12 according to the first preferred embodiment. Thus, the element-side drive electrodes 71 to 74 input a drive signal Vd1 to the drive portions 5A and 5B and input a drive signal Vd2 to the drive portions 5B and 6A.

Figure 11:
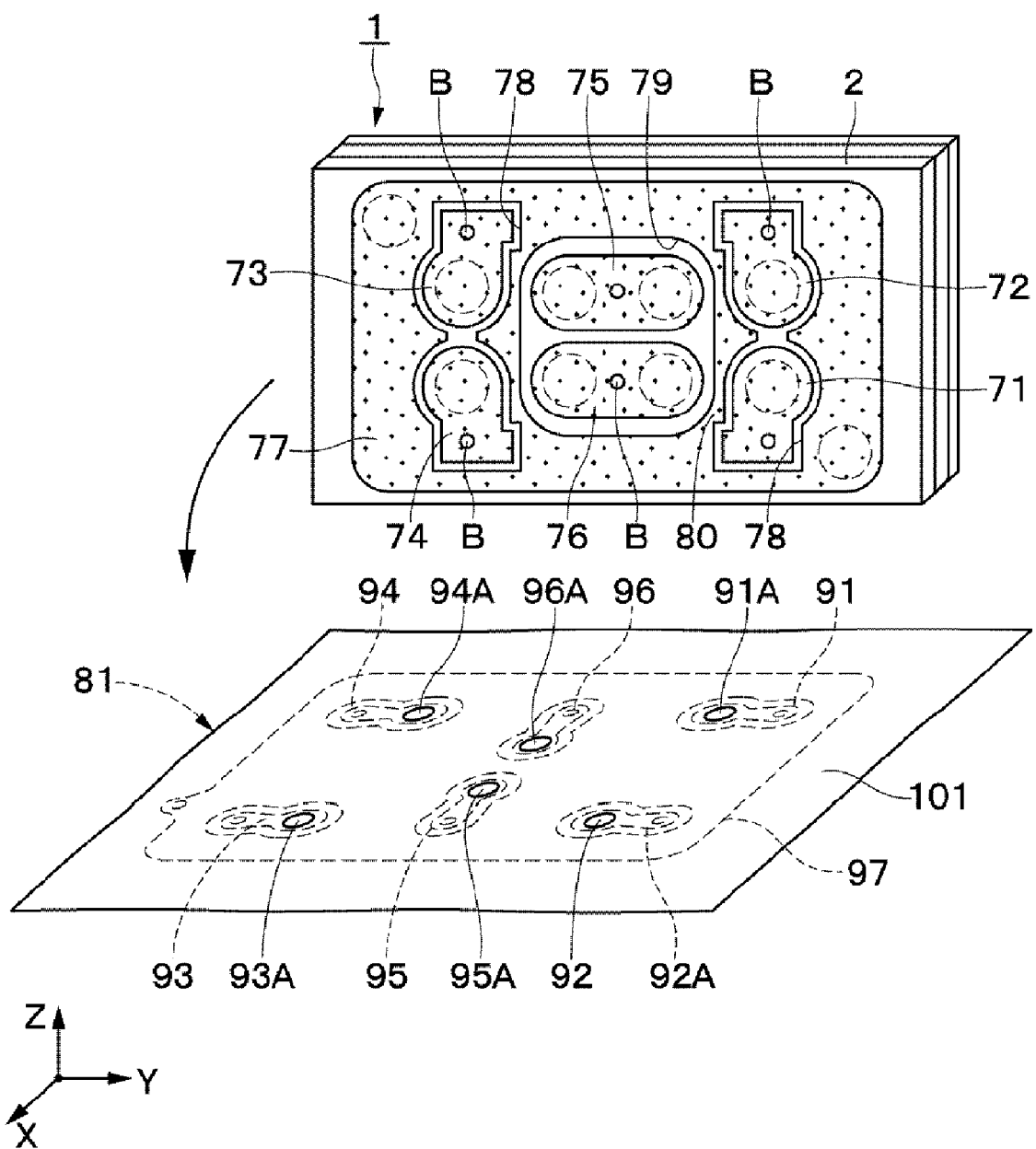
FIG. 11 is an exploded perspective view showing an angular velocity detection element and a multilayer substrate according to a third preferred embodiment of the present invention.
Figure 12:
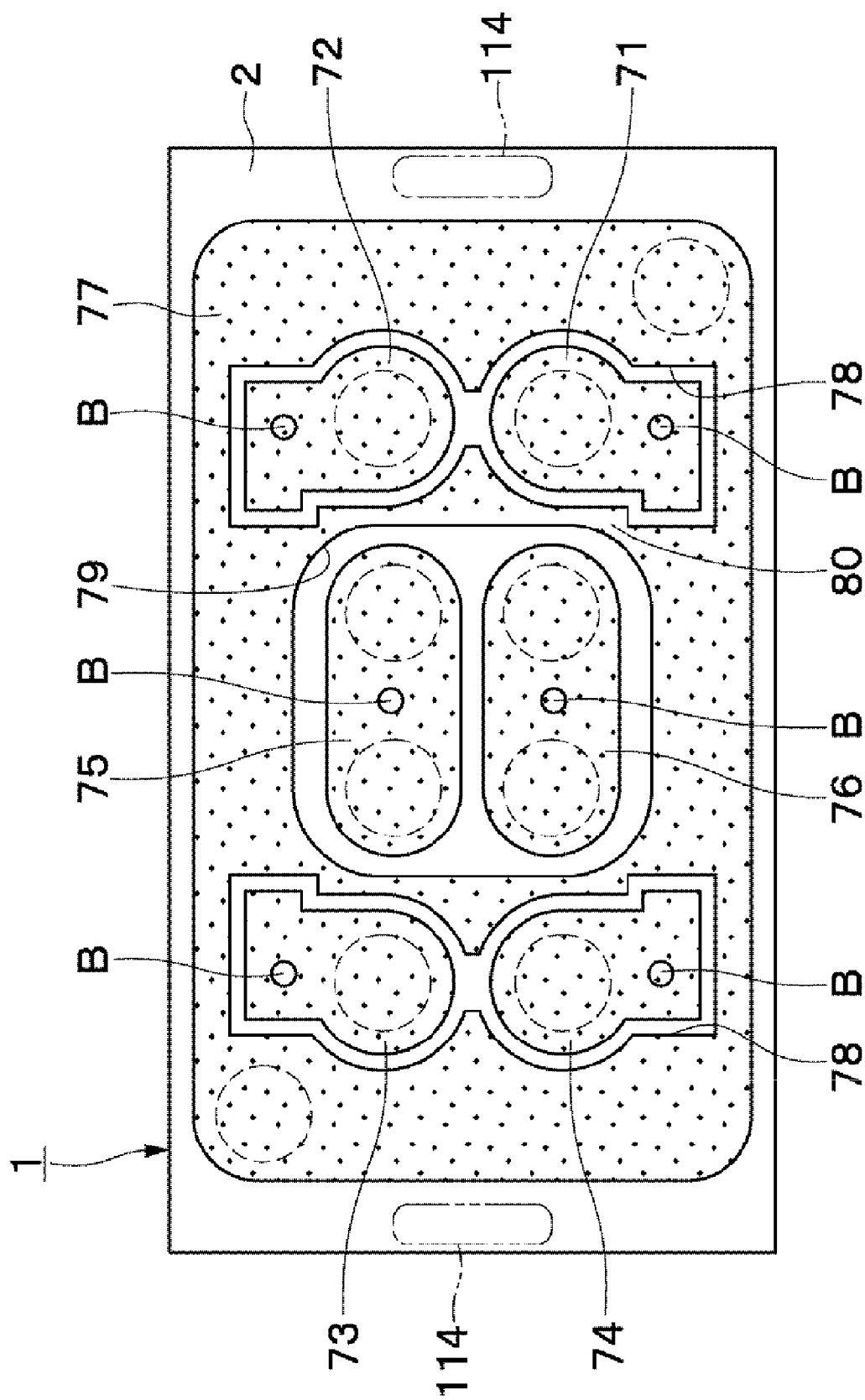
FIG. 12 is a bottom view showing the angular velocity detection element in FIG. 11.

Furthermore, as shown in FIGS. 11 and 12, the element-side drive electrodes 71 and 72 and the element-side drive electrodes 73 and 74 are disposed on the back surface of the element substrate 2 and arranged at locations that are separated in the direction of y axis.

Reference numerals 75 and 76 represent island-shaped element-side detection electrodes provided on the back surface of the element substrate 2. The element-side detection electrodes 75 and 76 are arranged between the element-side drive electrodes 73 and 74 and disposed on the side of the middle portion of the element substrate 2. Then, the element-side detection electrode 75 is connected to the detection portions 7A and 7B, and the element-side detection element 76 is connected to the detection portion 7B and 8A. Thus, the element-side detection electrodes 75 and 76 eliminate acceleration components from detection signals Vs1 to Vs4 output from the detection portions 7A, 7B, 8A, and 8B and output only angular velocity components.

Reference numeral 77 represents a ground electrode as an element-side low-impedance electrode provided on the back surface of the element substrate 2. The ground electrode 77 is disposed in a portion of the back surface of the element substrate 2 at which the periphery (vicinity) of the electrodes 71 to 76 is removed such that the ground electrode 77 may be insulated from the element-side drive electrodes 71 to 74 and the element-side detection electrodes 75 and 76. Accordingly, the ground electrode 77 is disposed over substantially the entire back surface of the element substrate 2. However, in the ground electrode 77, openings 78 are provided at the location of the element-side drive electrodes 71 and 72 and at the location of the element-side drive electrodes 73 and 74, and an opening 79 is provided at the location of the element-side detection electrodes 75 and 76. In this manner, a frame-shaped frame portion 80 disposed around the opening 79 in the ground electrode 77 encloses the element-side detection electrodes 75 and 76, and is disposed between the element-side detection electrodes 75 and 76 and the element-side drive electrodes 71 to 74. Then, the ground electrode 77 is connected to a ground electrode 97 on the side of a multilayer substrate 81 to be described later and kept at a ground potential as a low-impedance reference potential.

Reference numeral 81 represents a multilayer substrate on which the angular velocity detection element 1 is mounted.

Figure 15:
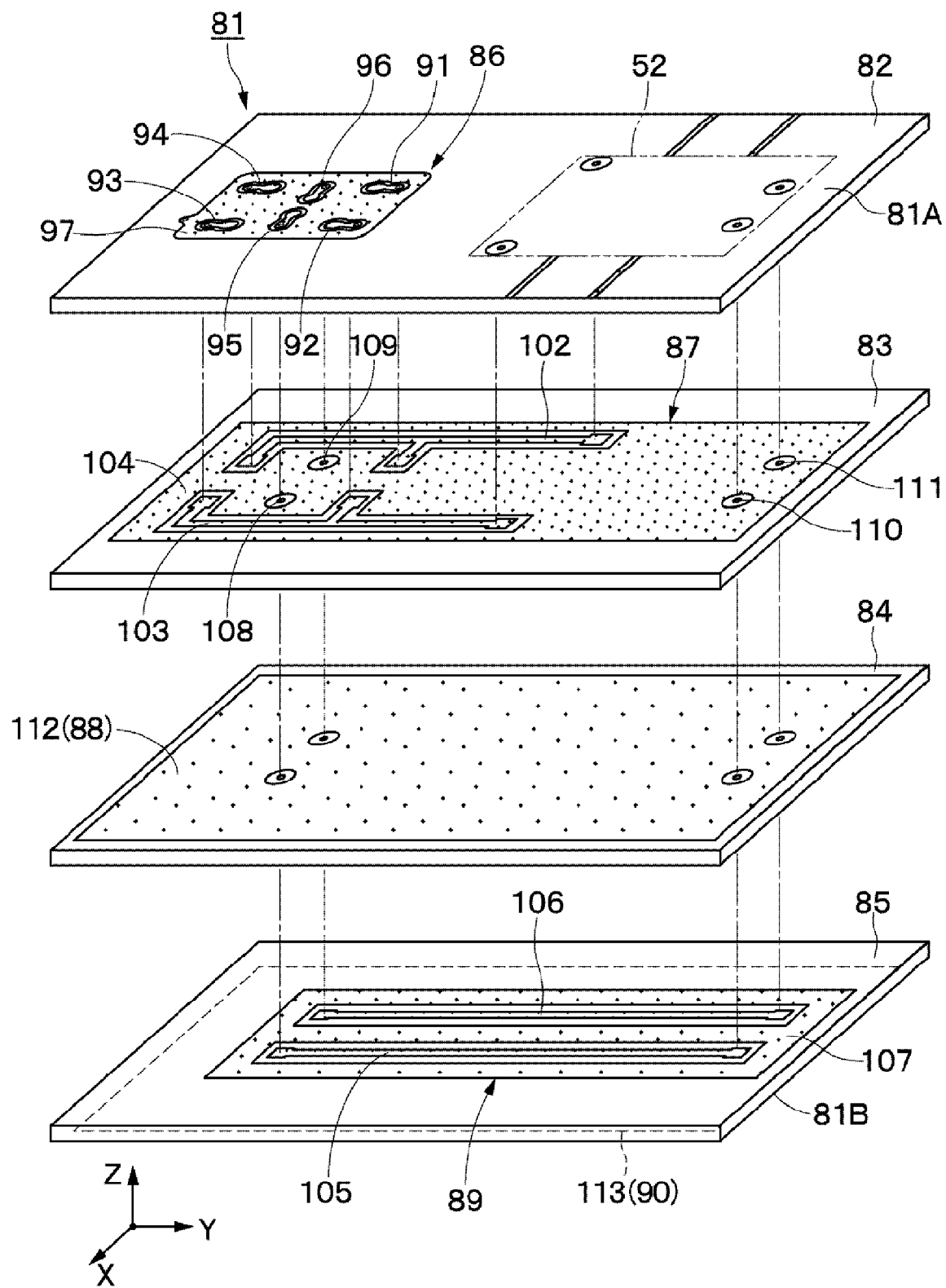
FIG. 15 is an exploded perspective view showing the multilayer substrate according to the third preferred embodiment of the present invention.

As shown in FIG. 15, the multilayer substrate 81 preferably includes a plurality (e.g., four) of insulation layers 82 to 85 made of a ceramic material such as alumina, or other suitable ceramic material, for example, and these insulation layers 82 to 85 are laminated. Then, a first electrode layer 86 is provided on the surface 81A of the multilayer substrate 81, a second electrode layer 87 is provided between the insulation layers 82 and 83, a third electrode layer 88 is provided between insulation layers 83 and 84, a fourth electrode layer 89 is provided between the insulation layers 84 and 85, and a fifth electrode layer 90 is provided on the back surface of the multilayer substrate 81.

Figure 13:
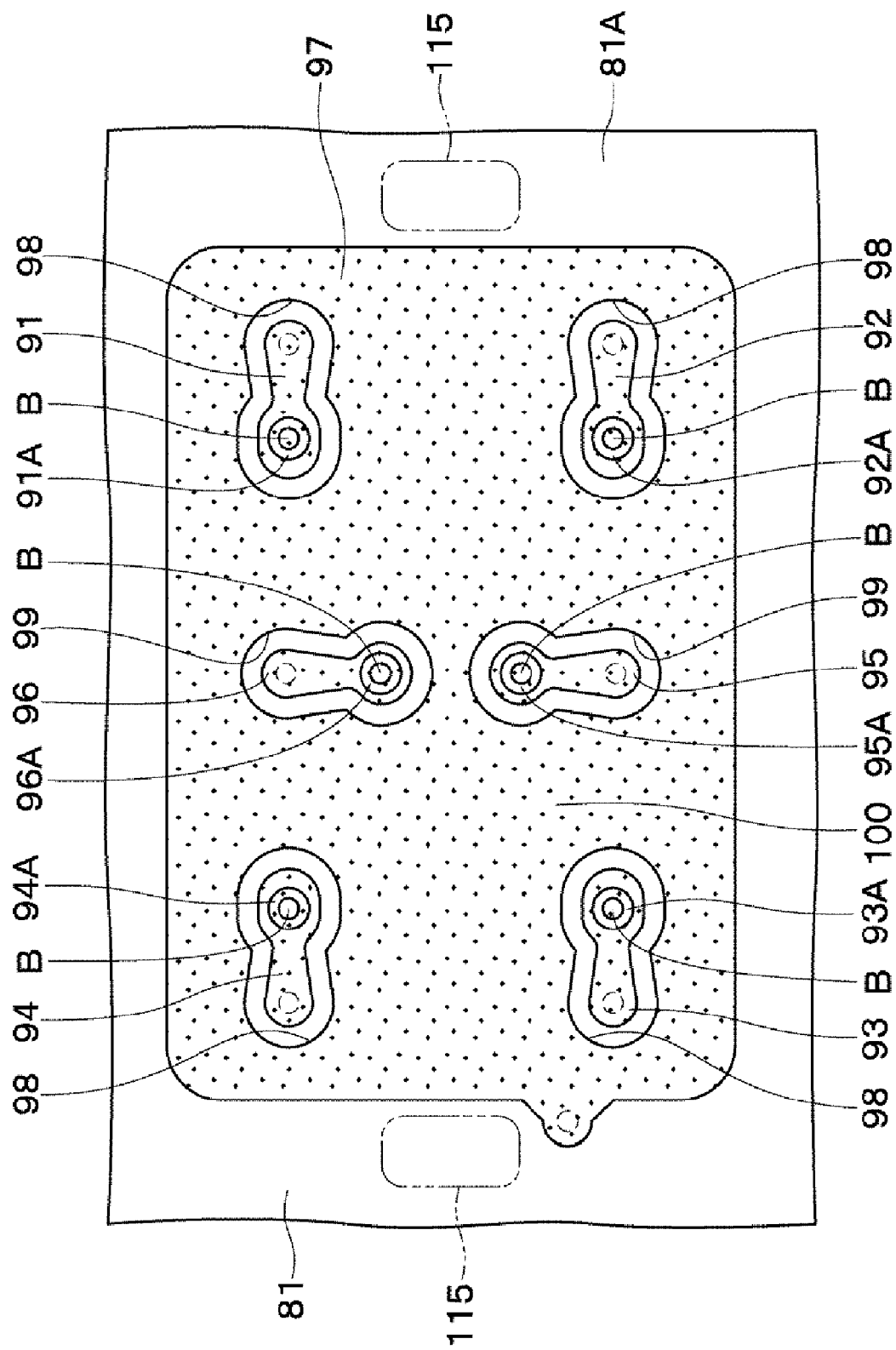
FIG. 13 is a top view showing the multilayer substrate in FIG. 11 in which a resist film is removed.
Figure 14:
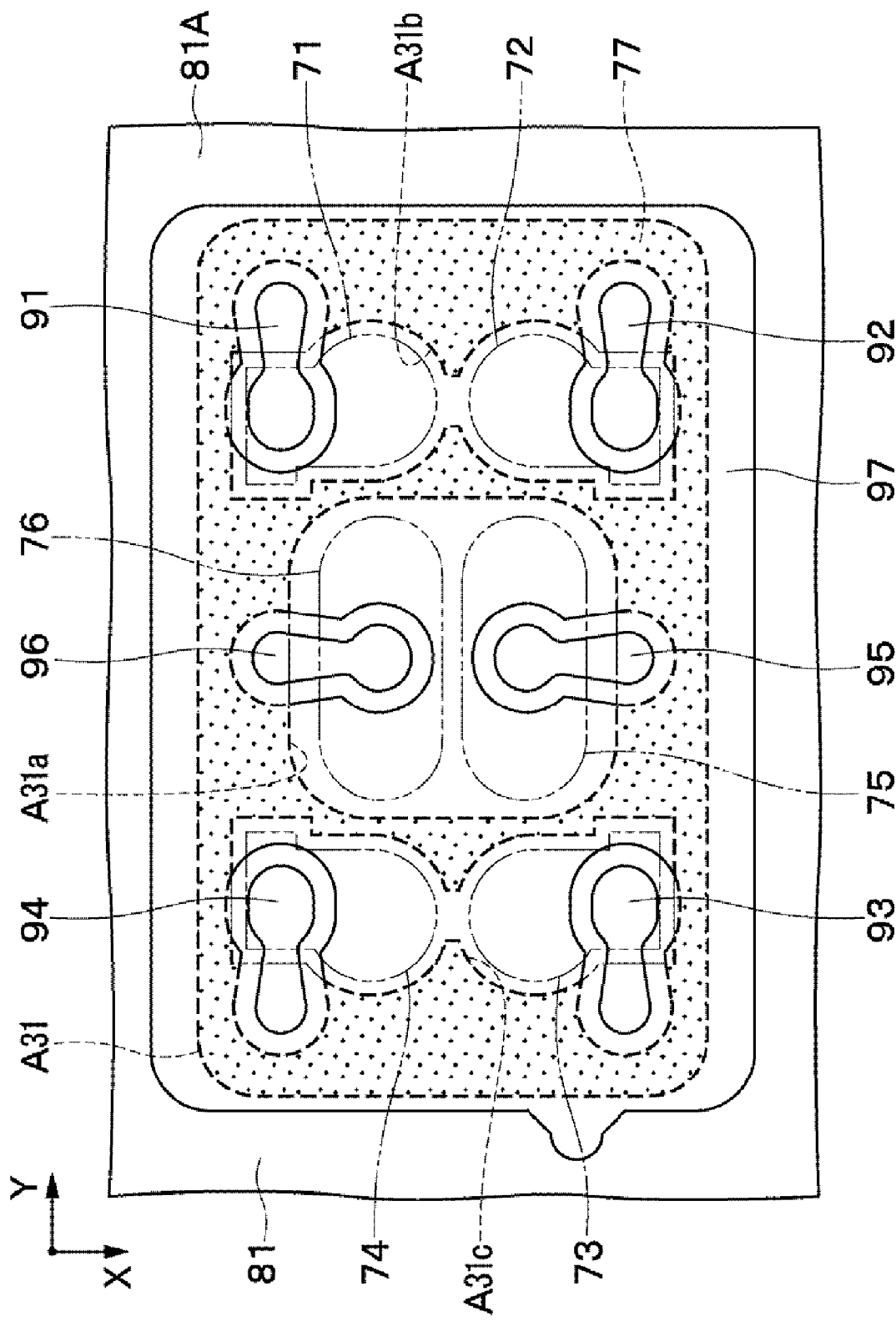
FIG. 14 is an illustration showing the portion in which a ground electrode of the angular velocity detection element and a ground electrode of the multilayer substrate of the third preferred embodiment face each other.

Reference numerals 91 to 94 represent substrate-side drive electrodes provided on the surface 81A of the multilayer substrate 81 (surface of the insulation layer 82 of the uppermost layer). As shown in FIGS. 13 and 14, the substrate-side drive electrodes 91 to 94 are island-shaped and disposed at the locations facing the element-side drive electrodes 71 to 74. Then, the substrate-side drive electrodes 91 and 92 and the substrate-side drive electrodes 93 and 94 are disposed so as to be separated from each other in the direction of Y axis, and the substrate-side drive electrodes 91 and 94 are connected to a drive wiring 102 to be described later, and the substrate-side drive electrodes 92 and 93 are connected a drive wiring 103 to be described later.

Reference numerals 95 and 96 represent substrate-side detection electrodes provided on the surface 81A of the multilayer substrate 81. The substrate-side detection electrodes 95 and 96 are disposed at locations facing the element-side detection electrodes 75 and 76 and located between the substrate-side drive electrodes 91 and 92 and the substrate-side drive electrodes 93 and 94. Then, the substrate-side detection electrodes 95 and 96 are connected to detection wirings 105 and 106 provided inside the multilayer substrate 81 via through-holes 108 and 109 to be described later.

Reference numeral 97 represents a ground electrode as a substrate-side low-impedance electrode provided on the surface 81A of the multilayer substrate 81. The ground electrode 97 is disposed over substantially the entire portion facing the angular velocity detection element 1 on the surface 81A of the multilayer substrate 81. However, the ground electrode 97 is provided in a portion where the periphery (vicinity) of the electrodes 91 to 96 is removed such that the ground electrode 97 may be insulated from the substrate-side drive electrodes 91 to 94 and the substrate-side detection electrodes 95 and 96. Accordingly, in the ground electrode 97, openings 98 are provided at the locations of the substrate-side drive electrodes 91 to 94, and openings 99 are provided at the locations of the substrate-side detection electrodes 95 and 96. Thus, in the ground electrode 97, a frame-shaped frame portion 100 disposed around the openings 99 encloses the substrate-side detection electrodes 95 and 96 and is disposed between the substrate-side detection electrodes 95 and 96 and the substrate-side drive electrodes 91 to 94. Then, the ground electrode 97 defines a first electrode layer 86 to be described later together with the substrate-side drive electrodes 91 to 94 and the substrate-side detection electrodes 95 and 96.

Furthermore, when the angular velocity detection element 1 is flip-chip mounted on the multilayer substrate 81, the ground electrode 97 on the side of the multilayer substrate 81 faces the ground electrode 77 on the side of the angular velocity detection element 1 (both ground electrodes 97 and 77 lie one on top of another), and the opposite portion A31 of the ground electrodes 77 and 97 is provided (portion enclosed by a broken line in FIG. 14). At this time, the opposite portions A31 of the ground electrodes 77 and 97 include three openings A31a, A31b, and A31c. Then, the detection electrodes 75, 76, 95, and 96 are disposed inside the opening A31a, the drive electrodes 71, 72, 91, and 92 are disposed inside the opening A31b, and the drive electrodes 73, 74, 93, and 94 are disposed inside the opening A31c. Accordingly, the opposite portions A31 of the ground electrodes 77 and 97 enclose the element-side detection electrodes 75 and 76 and the substrate-side detection electrodes 75 and 76 and the substrate-side detection electrodes 95 and 96, enclose the element-side drive electrodes 71 and 72 and the substrate-side drive electrodes 91 and 92, and enclose the element-side drive electrodes 73 and 74 and the substrate-side drive electrodes 93 and 94. In this manner, the opposite portion A31 of the ground electrodes 77 and 97 is disposed between the element-side electrodes 71 to 74 and the element-side detection electrodes 75 and 76.

Furthermore, the ground electrode 97 is connected to a ground electrode 104, to be described later, disposed inside the multilayer substrate 81 via a through-hole. Furthermore, the ground electrode 104 is connected to the signal processing circuit portion 52 via a through-hole. Accordingly, the ground electrode 97 is connected to the ground electrode (not illustrated) of the signal processing circuit portion 52 and maintained at ground potential as a reference potential of a low-impedance.

Moreover, a resist film 101 is disposed over substantially the entire surface of the multilayer substrate 81. Then, the resist film 101 covers the electrodes 91 to 97. However, in the electrodes 91 to 97, electrode pads 91A to 97A are exposed. Thus, the electrodes 91 to 97 are connected to the electrodes 71 to 77 using metal bumps B made of a conductive metal material such as gold, for example, provided on the electrode pads 91A to 97A, and the angular velocity detection element 1 is flip-chip mounted on the multilayer substrate 81.

Reference numerals 102 and 103 represent drive wirings disposed between the insulation layers 82 and 83. As shown in FIG. 15, the drive wirings 102 and 103 extend in the direction of Y axis of the multilayer substrate 81 and connect the substrate-side drive electrodes 91 to 94 and the signal processing circuit portion 52. Furthermore, the drive wirings 102 and 103 are arranged so as to be symmetrical in the direction of X axis. Here, the drive wiring 102 is connected to the substrate-side drive electrodes 91 and 94, and the drive wiring 103 is connected to the substrate-side drive electrodes 92 and 93. In this manner, the drive wirings 102 and 103 supply the drive signals Vd1 and Vd2 in opposite phases to each other applied from the signal processing circuit portion 52 to the substrate-side drive electrodes 91 to 94, and cause the vibrating bodies 3 and 4 of the angular velocity detection element 1 to vibrate in the direction of X axis.

Reference numeral 104 represents a ground electrode disposed between the insulation layers 82 and 83. The ground electrode 104 encloses each of the drive wirings 102 and 103. Here, one terminal side of the ground electrode 104 is connected to the ground electrode 97 of the multilayer substrate 81 via a through-hole (not illustrated) and the other terminal side is connected to the ground electrode (not illustrated) of the signal processing circuit portion 52 via a through-hole (not illustrated). Then, the ground electrode 104 defines a second electrode layer 87 together with the drive wirings 102 and 103.

Reference numerals 105 and 106 represent detection wirings disposed inside the multilayer substrate 81. The detection wirings 105 and 106 are disposed between the insulation layers 84 and 85, and extend in the direction of Y axis substantially parallel to each other toward the signal processing circuit portion 52 from the angular velocity detection element 1. Furthermore, a ground electrode 107 as a low-impedance wiring enclosing each of the detection wirings 105 and 106 is disposed between the insulation layers 84 and 85. Here, the ground electrode 107 is connected to the ground electrode (not illustrated) of the signal processing circuit portion 52 via a through-hole (not illustrated). Then, the detection wirings 105 and 106 define a fourth electrode layer 89 together with the ground electrode 107.

Furthermore, one terminal side of the detection wirings 105 and 106 is connected to the substrate-side detection electrodes 95 and 96 via through-holes 108 and 109, and the other terminal side is connected to the signal processing circuit portion 52 via through-holes 110 and 111.

Reference numeral 112 represents a ground electrode as a low-impedance wiring disposed between the insulation layers 83 and 84. The ground electrode 112 faces substantially the entire length of the detection wirings 105 and 106 and covers substantially the entire surface of the insulation layer 84. However, the ground electrode 112 is disposed at a location at which the periphery of the through-holes 108 to 111 is excluded such that the ground electrode 112 may be insulated from the detection wirings 105 and 106. Furthermore, the ground electrode 112 is connected to the ground electrode (not illustrated) of the signal processing circuit portion 52 via a through-hole (not illustrated), and defines a third electrode layer 88. Then, the ground electrode 112 is disposed between the drive wirings 102 and 103 and the detection wirings 105 and 106 and reduces a coupling capacitance therebetween.

Reference numeral 113 represents a ground electrode as a low-impedance wiring disposed on the back surface 81B of the multilayer substrate 81. The ground electrode 113 faces substantially the entire length of the detection wirings 105 and 106 and covers substantially the entire back surface 81B. Furthermore, the ground electrode 113 is connected to the ground electrode (not illustrated) of the signal processing circuit portion 52 via a through-hole (not illustrated), and defines a fifth electrode layer 90. Then, the ground electrode 113 reduces the coupling capacitance between the drive wirings 102 and 103 and the detection wirings 105 and 106 and prevents noise (noise signals) from the outside from mixing into the detection wirings 105 and 106.

Thus, also in the present preferred embodiment, substantially the same operation-effect as in the first preferred embodiment are obtained. In particular, in the present preferred embodiment, the drive wirings 102 and 103 are disposed inside the multilayer substrate 81, and the substrate-side drive electrodes 91 to 94 and the substrate-side detection electrodes 95 and 96 are enclosed by the ground electrode 97. At this time, element-side drive electrodes 71 to 74 and the element-side detection electrodes 75 and 76 are also enclosed by the ground electrode 77. Accordingly, the opposite portion A31 of the ground electrodes 77 and 97 encloses the element-side detection electrodes 75 and 76 and the substrate-side detection electrodes 95 and 96 and can enclose the element-side drive electrodes 71 to 74 and the substrate-side drive electrodes 91 to 94. In this manner, the opposite portion A31 of the ground electrodes 77 and 97 cuts off the coupling between the drive electrodes 71 to 74, and 91 to 94 the detection electrodes 75, 76, 95, and 96, and prevents the occurrence of crosstalk.

Furthermore, since the opposite portion A31 of the ground electrodes 77 and 97 encloses the drive electrodes 71 to 74, and 91 to 97, it prevents crosstalk between the drive electrodes 71 to 74, and 91 to 94 and not only the detection electrodes 75, 76, 95, and 96, but also the other electrodes. Accordingly, when a monitoring element (not illustrated) for detecting the vibration in the direction of vibration (direction of x axis) of the vibrating bodies 3 and 4 is provided in the angular velocity detection element 1, as shown by a two-dot line in FIGS. 11 and 12, for example, monitoring electrodes 114 and 115 connected to the monitoring element can be provided outside the ground electrodes 77 and 97. At this time, the monitoring element is defined by comb-shaped electrodes in the same manner as a displacement detecting element and the same monitoring signals as the detection signals Vs1 to Vs4 are output. Accordingly, the monitoring signals are also easily affected by the drive signals Vd1 and Vd2. On the contrary, in the present preferred embodiment, since the opposite portion A31 of the ground electrodes 77 and 97 encloses the drive electrodes 71 to 74, and 91 to 94, the coupling between the drive electrodes 71 to 74, and 91 to 94 and the monitoring electrodes 114 and 115 is cut off, and the detection accuracy of monitoring signals is increased.

Figure 16:
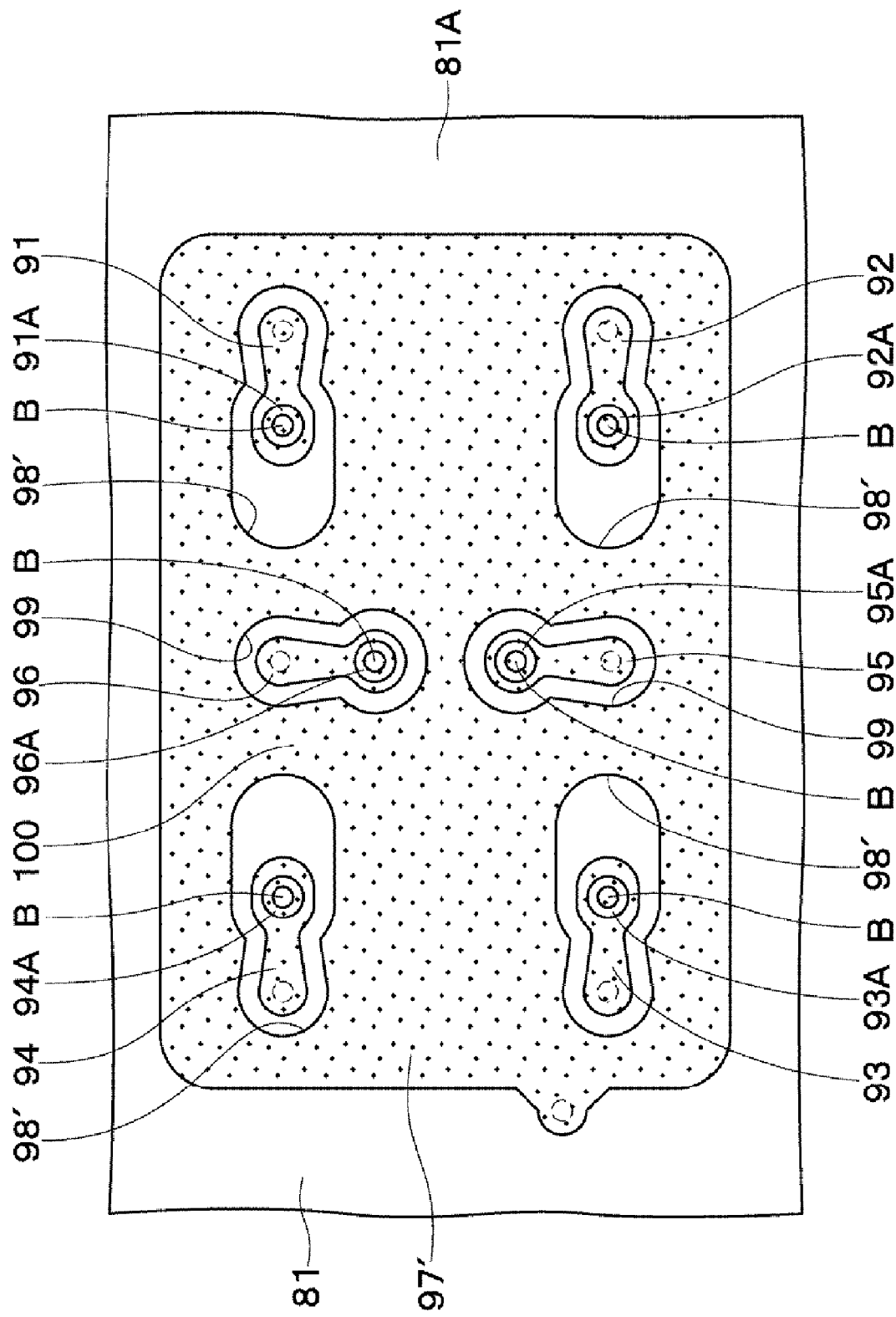
FIG. 16 is a bottom view showing an angular velocity detection element according to a first modified example.
Figure 17:
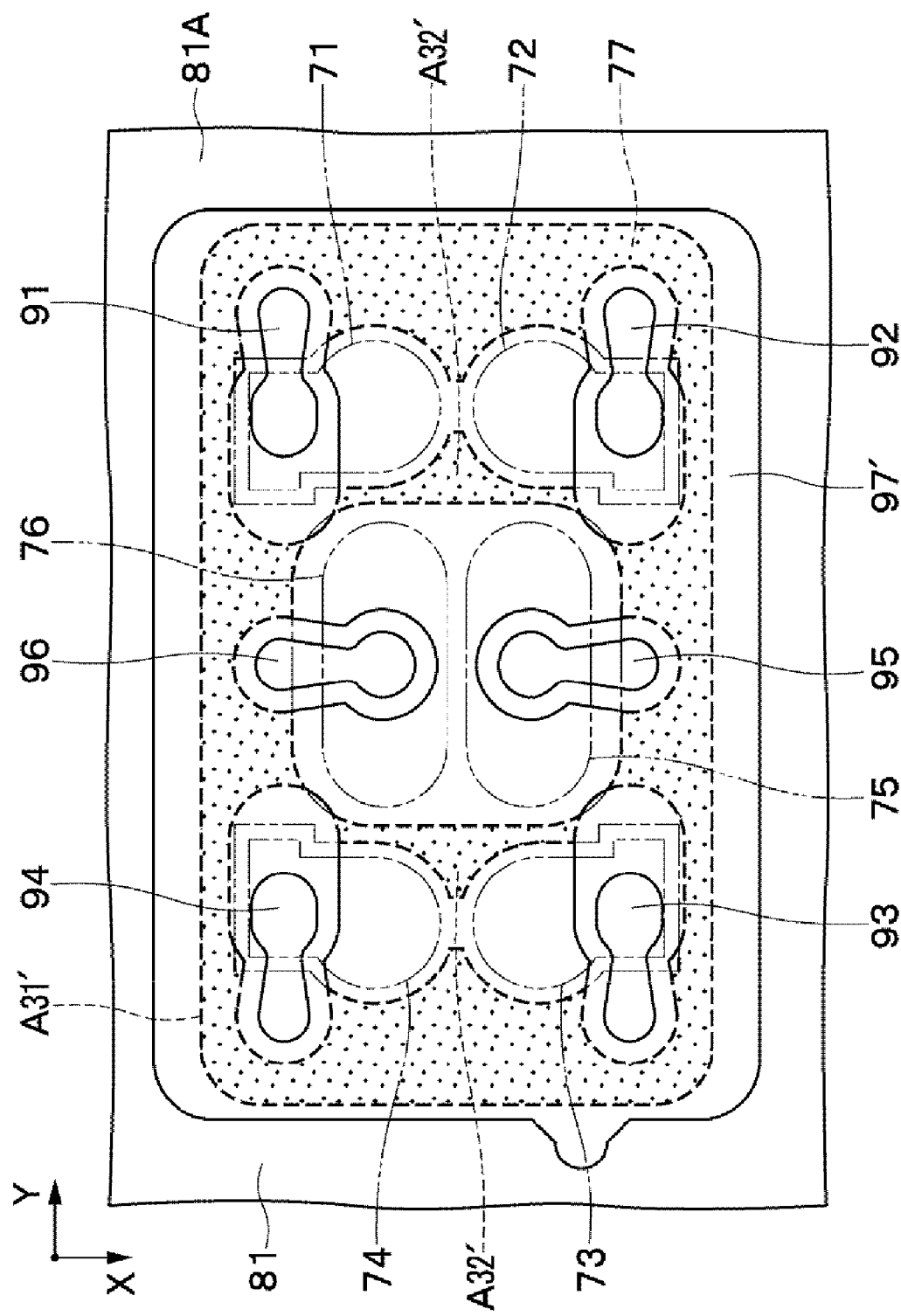
FIG. 17 is an illustration showing the portion in which a ground electrode of the angular velocity detection element and a ground electrode of the multilayer substrate of the first modified example face each other.

Moreover, in the third preferred embodiment, the opposite portion A31 of the ground electrodes 77 and 97 encloses the detection electrodes 75, 76, 95, and 96 without being disconnected. However, the present invention is not limited to this, and, like a first modified example shown in FIGS. 16 and 17, for example, when openings 98' of a ground electrode 97' on the side of the multilayer substrate 81 are increased in size, a portion including the detection electrodes 75, 76, 95, and 96 of an opposite portion A31' of the ground electrodes 77 and 97' may be disconnected. Also, in the first modified example, since an opposite portion A32' where the ground electrodes 77 and 97' face each other are disposed between the dielectric electrodes 75, 76, 95, and 96 and the drive electrodes 71 to 74, and 91 to 94, the coupling between the detection electrodes 75, 76, 95, and 96 and the drive electrodes 71 to 74, and 91 to 94 is cut off.

Figure 18:
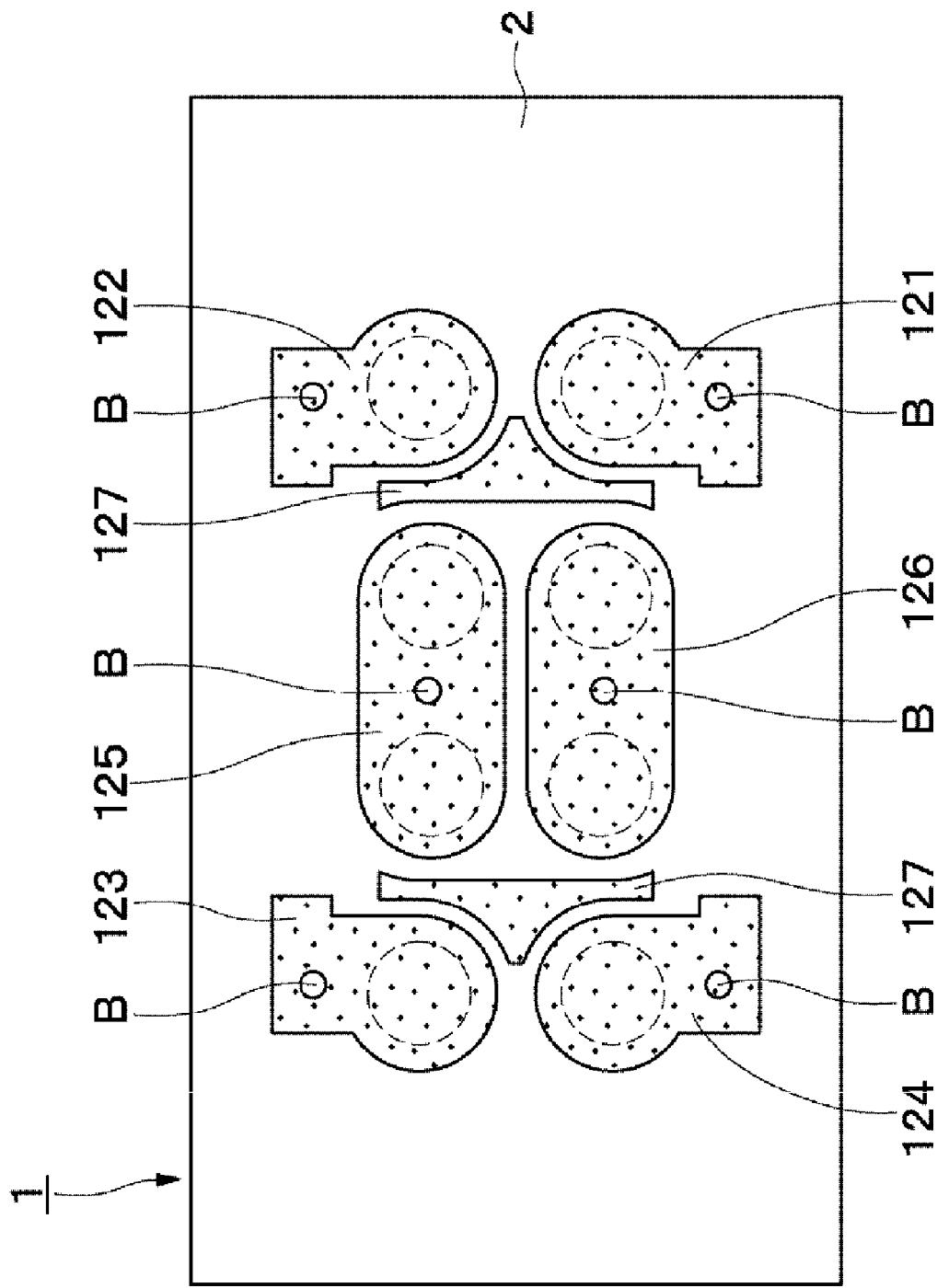
FIG. 18 is a bottom view showing an angular velocity detection element according to a fourth preferred embodiment of the present invention.
Figure 19:
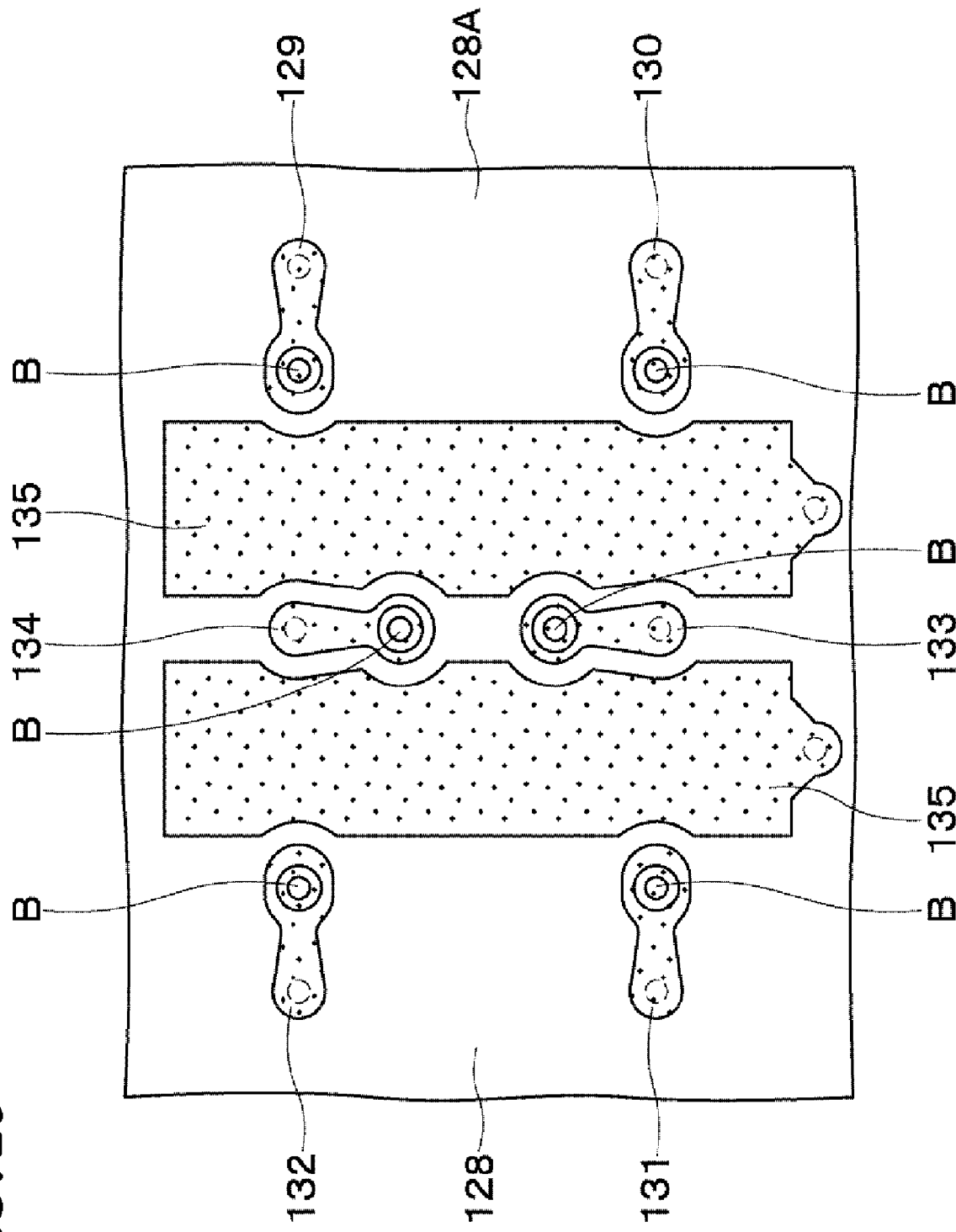
FIG. 19 is a top view showing a multilayer substrate according to the fourth preferred embodiment in which a resist film is removed.
Figure 20:
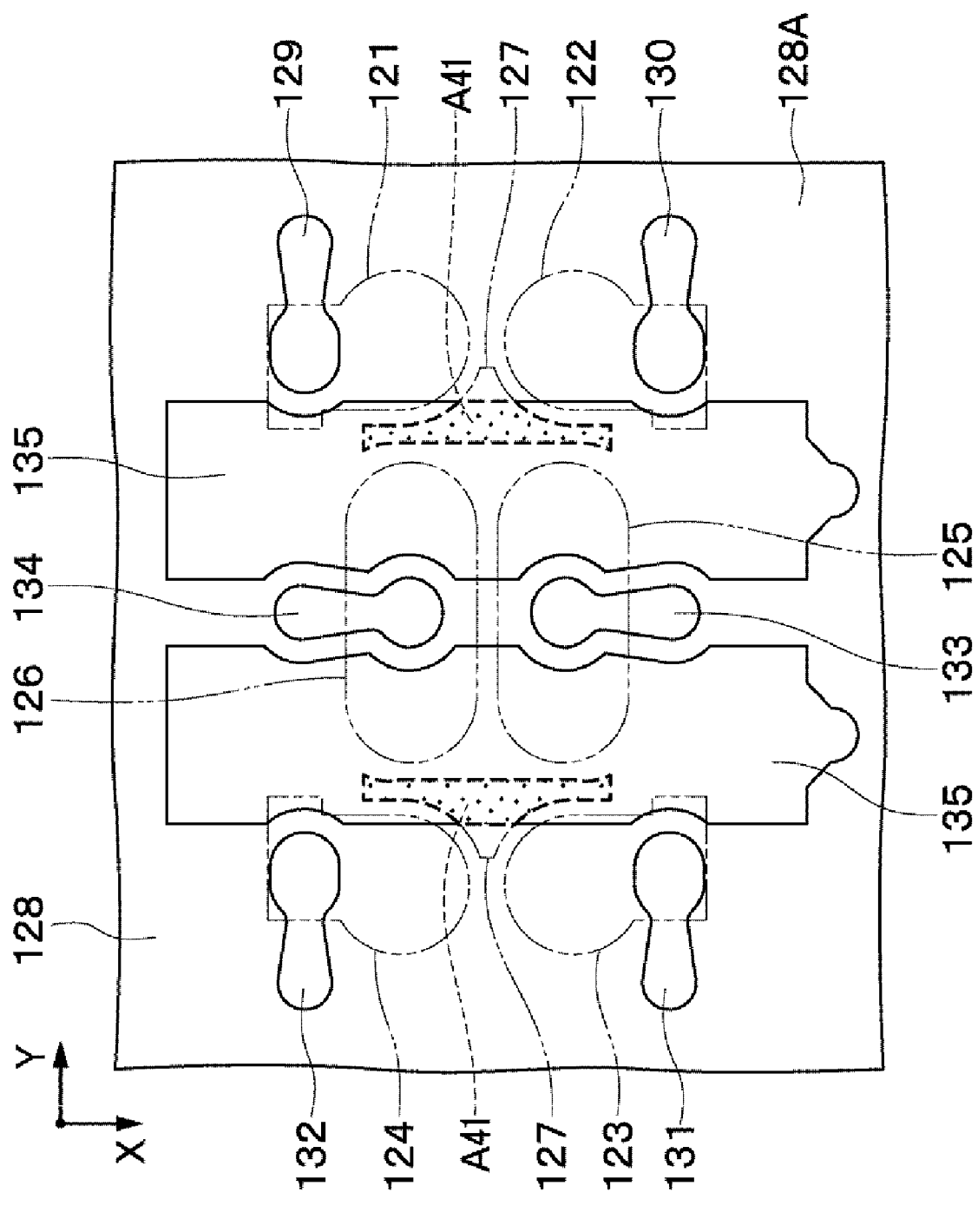
FIG. 20 is an illustration showing the portion in which a ground electrode of the angular velocity detection element and a ground electrode of the multilayer substrate of the fourth preferred embodiment face each other.

Next, FIGS. 18 to 20 show a fourth preferred embodiment of the present invention which includes a ground electrode disposed between the element-side electrodes and the element-side detection electrodes, a ground electrode disposed between the substrate-side drive electrodes and the substrate-side detection electrodes, and the element-side ground electrode and the substrate-side electrode are arranged to at least partially face each other. Moreover, in the present preferred embodiment, the same reference numerals are given the same or similar components as in the first preferred embodiment and their descriptions are omitted.

Reference numerals 121 to 124 represent island-shaped element-side drive electrodes disposed on the back surface (mounting surface) of the element substrate 2. The element-side drive electrodes 121 to 124 are connected to the drive portions 5A, 5B, 6A, and 6B substantially in the same way as the element-side drive electrodes 9 to 12 according to the first preferred embodiment. In this manner, the element-side drive electrodes 121 to 124 input a drive signal Vd1 to the drive portions 5A and 6B, and input a drive signal Vd2 to the drive portions 5B and 6A.

Furthermore, as shown in FIGS. 18 and 20, the element-side drive electrodes 121 and 122 and the element-side drive electrodes 123 and 124 are disposed on the back surface side of the element substrate 2 and arranged at locations separated from each other in the direction of Y axis.

Reference numerals 125 and 126 represent island-shaped element-side detection electrodes disposed on the back surface of the element substrate 2. The element-side detection electrodes 125 and 126 are arranged between the element-side drive electrodes 121 and 122 and the element-side drive electrodes 123 and 124 and disposed on the side of the middle portion of the element substrate 2. Then, the element-side detection electrode 125 is connected to the detection portions 7A and 7B, and the element-side detection electrode 126 is connected to the detection portions 7B and 8A. Thus, the element-side detection electrodes 125 and 126 eliminate acceleration components from detection signals Vs1 to Vs4 output from the detection portions 7A, 7B, 8a, and 8B, and output only angular velocity components.

Reference numerals 127 represent ground electrodes as element-side low-impedance electrodes, two of which are disposed on the back surface of the element substrate 2. Here, one ground electrode 127 is disposed between the element-side drive electrodes 121 and 122 and the element-side detection electrodes 125 and 126, and the other ground electrode 127 is disposed between the element-side drive electrodes 123 and 124 and the element-side detection electrodes 125 and 126. Then, these ground electrodes 127 are disposed in a portion excluding the periphery (vicinity) of the electrodes 121 to 126 of the back surface of the element substrate 2 such that the ground electrode 127 may be insulated from the element-side drive electrodes 121 to 124 and the element-side detection electrodes 125 and 126. Furthermore, the ground electrodes 127 are connected to a ground electrode 135 on the side of the multilayer substrate 128 to be described later and maintained at a ground potential as a low-impedance reference potential.

Reference numeral 128 represents a multilayer substrate in which the angular velocity detection element 1 is mounted. The multilayer substrate 128 includes four insulation layers 82 to 85 substantially in the same way as the multilayer substrate 81 according to the third preferred embodiment, for example, and the ground electrode (not illustrated) as a drive wiring, detection wiring, and low-impedance wiring are disposed therein.

Reference numerals 129 to 132 represent substrate-side drive electrodes disposed on the surface 128a of the multilayer substrate 128. The substrate-side drive electrodes 129 to 132 are island-shaped as shown in FIG. 19 band 20, and disposed at locations facing the element-side drive electrodes 121 to 124. Furthermore, the substrate-side drive electrodes 129 and 130 and the substrate-side drive electrodes 131 and 132 are arranged so as to be separated in the direction of Y axis, and the substrate-side drive electrodes 129 to 132 are connected to the drive wirings (not illustrated) inside the multilayer substrate 128. Then, a drive signal Vd1 is applied to the substrate-side drive electrodes 129 and 132, and a drive signal Vd2 is applied to the substrate-side drive electrodes 130 and 131.

Reference numerals 133 and 134 represent substrate-side detection electrodes disposed on the surface 128a of the multilayer substrate 128. The substrate-side detection electrodes 133 and 134 are disposed at locations facing the element-side detection electrodes 125 and 126, and arranged between the substrate-side electrodes 129 and 130 and the substrate-side drive electrodes 131 and 132. Then, the substrate-side detection electrodes 133 and 134 are connected to the detection wiring (not illustrated) inside the multilayer substrate 81.

Reference numerals 135 represent ground electrodes as substrate-side low-impedance electrodes, two of which are disposed on the surface 128a of the multilayer substrate 128. Here, one ground electrode 135 is disposed between the substrate-side drive electrodes 129 and 130 and the substrate-side detection electrodes 133 and 134, and the other ground electrode 135 is disposed between the substrate-side drive electrodes 131 and 132 and the substrate-side detection electrodes 133 and 134. Then, these ground electrodes 135 are provided in a portion excluding the periphery (vicinity) of the electrodes 129 to 134 of the surface 128a of the multilayer substrate 128 so that the ground electrodes 135 may be insulated from the substrate-side drive electrodes 129 to 132 and the substrate-side detection electrodes 133 and 134.

Furthermore, the ground electrode 135 is connected to a ground electrode (not illustrated) disposed inside the multilayer substrate 128 via a through-hole. Then, the ground electrode 135 is connected to the signal processing circuit portion via the ground electrode inside the multilayer substrate 128 and maintained at a ground potential as a low-impedance reference potential.

Furthermore, when the angular velocity detection element 1 is flip-flop mounted on the multilayer substrate 128, the ground electrode 135 on the side of the multilayer substrate 128 faces the ground electrode 127 on the side of the angular velocity detection element 1 and the opposite portion A41 (portion enclosed by a broken line in FIG. 20) of the ground electrodes 127 and 135 is disposed on both sides in the direction of Y axis of the detection electrodes 125, 126, 133, and 134. At this time, one opposite portion A41 of the ground electrodes 127 and 135 is disposed between the drive electrodes 121, 122, 129, and 130 and the detection electrodes 125, 126 133, and 134. Furthermore, the other opposite portion A41 of the ground electrodes 127 and 135 is disposed between the drive electrodes 123, 124, 131, and 132 and the detection electrodes 125, 126, 133, and 134.

Then, the electrodes 129 to 135 are connected to the electrodes 121 to 127 of the angular velocity detection element 1 using metal bumps B made of a conductive metal material, such as gold, for example, and the angular velocity detection element 1 is flip-chip mounted on the multilayer substrate 128.

Thus, also in the present preferred embodiment, substantially the same operation-effect as in the first preferred embodiment is obtained. In particular, in the present preferred embodiment, since the opposite portion A41 of the ground electrodes 127 and 135 is disposed between the drive electrodes 121 to 124, and 129 to 132 and the detection electrodes 125, 126, 133, and 134, the coupling between the drive electrodes 121 to 124, and 129 to 132 and the detection electrodes 125, 126, 133, and 134 is cut off by using the opposite portion A41 of the ground electrodes 127 and 135, and the occurrence of crosstalk is prevented.

Furthermore, in the present preferred embodiment, the ground electrodes 127 and 135 do not enclose the drive electrodes 121 to 124, 129 to 132 and the detection electrodes 125, 126, 133, and 134, and is disposed only between the drive electrodes 121 to 124, and 129 to 132 and the detection electrodes 125, 126, 133, and 134. Accordingly, various windings can be disposed around the drive electrodes 121 to 124, and 129 to 132, for example, and the back surface of the element substrate 2 and the surface of the multilayer substrate 128 can be effectively used.

Moreover, in each above-described preferred embodiment, an angular velocity detection element 1 including two vibrating bodies 3 and 4 is preferably used. However, the present invention is not limited to this, and, in the same way as the related technology, an angular velocity detection element including a single vibrating body may be used.

Furthermore, in the above-described first and second preferred embodiments, although the ground electrodes 50 and 51 are disposed in the second and fourth electrode layers 26 and 28 so as to sandwich the detection wirings 43 and 44 defining the third electrode layer 27, both of the ground electrodes 50 and 51 are not necessarily required, and either of the two may be used. Also in the third preferred embodiment, although the two ground electrodes 112 and 113 are provided, either one of the ground electrodes 112 and 113 may be provided.

Furthermore, in each above-described preferred embodiment, the element-side drive electrodes 9 to 12, 71 to 74, and 121 to 124, the element-side detection electrodes 13, 14, 75, 76, 125, and 126, and the ground electrodes 15, 77, and 127 are arranged so as to be symmetrical in the direction of X axis and the direction of Y axis around the center of these and the coupling capacitance between the element-side detection electrodes 13, 75, and 125 and the element-side drive electrodes 9 to 12, 71 to 74, and 121 to 124 is set so as to be substantially the same as the coupling capacitance between the element-side detection electrodes 14, 76, and 126 and the element-side drive electrodes 9 to 12, 71 to 74, and 121 to 124. However, the present invention is not limited to these, and when the ground electrodes 15, 77, and 127 are disposed between the element-side drive electrodes 9 to 12, 71 to 74, and 121 to 124 and the element-side detection electrodes 13, 14, 75, 76, 125, and 126, the above-described coupling capacitance may be different from each other.

In the same manner, although the substrate-side drive electrodes 29 to 32, 91 to 94, and 129 to 132, the substrate-side detection electrodes 33, 34, 95, 96, 133, and 134, and the ground electrodes 35, 97, and 135 are arranged so as to by symmetrical in the direction of X axis and the direction of Y axis around the center of these and the coupling capacitance between the substrate-side detection electrodes 3, 95, and 133 and the substrate-side drive electrodes 29 to 32, 91 to 94, and 129 to 132 is set so as to be substantially the same as the coupling capacitance between the substrate-side detection electrodes 34, 96, and 124 and the substrate-side drive electrodes 29 to 32, 91 to 94, and 129 to 132, when the ground electrodes 35, 97, and 135 are disposed between the substrate-side drive electrodes 29 to 32, 91 to 94, and 129 to 132 and the substrate-side detection electrodes 33, 34, 95, 96, 133, and 134, the above-described coupling capacitance may be different from each other.

Furthermore, in each above-described preferred embodiment, the ground electrodes 15, 35, 77, 97, 127, and 135 as a low-impedance electrode are provided, and the ground electrodes 45, 50, 51, 107, 112, and 113 as a low-impedance wiring are provided. However, the present invention is not limited to these, the low-impedance electrode and low-impedance wiring are not necessarily connected to the ground, and a low-impedance DC voltage wiring may be used as a low-impedance wiring, for example.

Moreover, in the above-described first and second preferred embodiments, a multilayer substrate 21 including three insulation layers 22 to 24 (four electrode layers 25 to 28) is used, and, in the third preferred embodiment, a multilayer substrate 81 including four insulation layers 82 to 85 (five electrodes layers 86 to 90) is used. However, the present invention is not limited these, and a multilayer substrate made up of five or more insulation layers (six or more electrode layers) may be used, for example.

Furthermore, in each above-described preferred embodiment, although the insulation layers 22 to 24, and 82 to 85 are formed using alumina (aluminum oxide), they may be formed by using other ceramic materials, other insulation materials of resin materials, or other suitable materials.

Furthermore, in each above-described preferred embodiment, the drive wirings 41, 42, 102, and 103 are disposed at different locations from the detection wirings 43, 44, 105, and 106 in the thickness direction of the multilayer substrates 21 and 81. However, the present invention is not limited to these, and, for example, the drive wiring may be disposed at a location (other electrode layer) different from the detection wiring in the thickness direction of the multilayer substrate and may be disposed at the same location as the detection wiring in the thickness direction of the multilayer substrate.

In particular, when the drive wiring and the detection wiring are disposed at the same location in the thickness direction of the multilayer substrate, a low-impedance wiring is disposed at a location different from the detection wiring in the thickness direction of the multilayer substrate and another low-impedance wiring may be disposed at the same location as the detection wiring, etc., and between the drive wiring and the detection wiring. In this case, the drive wiring and the detection wiring can be isolated from each other by using another low-impedance wiring and the occurrence of crosstalk between them can be prevented.

Moreover, in each above-described preferred embodiment, the large width ground electrodes 50, 51, 112, and 113 facing the detection wirings 43, 44, 105, and 106 are preferably used. However, the present invention is not limited to these, and a small width (long and narrow) ground electrode as a low-impedance wiring facing the detection wiring may be used. Furthermore, in each above-described preferred embodiment, although the ground electrodes 50, 51, 112, and 114 as a low-impedance wiring faces the detection wirings 43, 44, 105, and 106 over substantially the entire length, the low-impedance wiring is not necessarily required to face the detection wiring over substantially the entire length, and, for example, the low-impedance wiring may face a portion of the entire length of the detection wiring.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. An angular velocity measuring device comprising:
   a substrate;
   an angular velocity detection element having a vibrating body disposed in the substrate so as to be vibrated in first and second axial directions out of three axial directions corresponding to three axes disposed at right angles to each other, a driving element arranged to vibrate the vibrating body in the first axial direction using a drive signal, and a displacement detecting element arranged to detect displacement in the second axial direction of the vibrating body and output a detection signal when an angular velocity is applied around the third axis while the vibrating body is vibrated in the first axial direction;
   drive wiring disposed in the substrate and connected to the driving element of the angular velocity detection element;
   detection wiring disposed in the substrate and connected to the displacement detecting element of the angular velocity detection element; and
   a signal processing element disposed in the substrate and connected to the drive wiring and the detection wiring; wherein
   the substrate is a multilayer substrate including a plurality of insulation layers;
   the detection wiring is disposed between two of the plurality of insulation layers inside the multilayer substrate;
   low-impedance wiring facing the detection wiring is disposed at a location different from the detection wiring in the thickness direction of the multilayer substrate therein;
   the angular velocity detection element includes an element-side drive electrode connected to the driving element, an element-side detection electrode connected to the displacement detecting element, and an element-side low-impedance electrode located between the element-side drive electrode and the element-side detection electrode arranged to cut off the coupling between the element-side drive electrode and the element-side detection electrode located on a mounting surface side of the multilayer substrate;
   on the top surface of the multilayer substrate, a substrate-side drive electrode connected to the drive wiring and facing the element-side drive electrode, a substrate-side detection electrode connected to the detection wiring and facing the element-side detection electrode, and a substrate-side low-impedance electrode positioned between the substrate-side drive electrode and the substrate-side detection electrode arranged to cut off the coupling between the substrate-side drive electrode and the substrate-side detection electrode are provided;
   the angular velocity detection element is mounted on a top surface of the multilayer substrate via metal bumps;
   the element-side drive electrode and the substrate-side drive electrode are connected via metal bumps;
   the element-side detection electrode and the substrate-side detection electrode are connected via metal bumps;
   the element-side low-impedance electrode and the substrate-side low-impedance electrode are connected at a low-impedance reference potential; and
   the element-side low-impedance electrode and the substrate-side low-impedance electrode are arranged to at least partially face each other.

2. The angular velocity measuring device according to claim 1, wherein the multilayer substrate includes three insulation layers.

3. The angular velocity measuring device according to claim 1, wherein the multilayer substrate includes four insulation layers.

4. The angular velocity measuring device according to claim 1, wherein the element-side drive electrode is island-shaped.

5. The angular velocity measuring device according to claim 1, wherein the element-side detection electrode is island-shaped.

6. The angular velocity measuring device according to claim 1, wherein the element-side low-impedance electrode is defined by a ground electrode that substantially covers the entire mounting surface side of the multilayer substrate, except for locations at which the element-side drive electrode and the element-side detection electrode are disposed.

7. The angular velocity measuring device according to claim 1, wherein the element-side detection electrode is disposed in a central portion of mounting surface side of the multilayer substrate.

8. The angular velocity measuring device according to claim 1, wherein the substrate-side detection electrode is island-shaped.

9. The angular velocity measuring device according to claim 1, wherein the substrate-side low-impedance electrode is defined by a ground electrode that substantially covers an entire portion of the substrate that faces the angular velocity detection element, except at locations at which the substrate-side drive electrode and the substrate-side detection electrode are disposed.

10. The angular velocity measuring device according to claim 1, wherein the substrate-side detection electrode is disposed in a central portion of the substrate.

11. An angular velocity measuring device comprising:
    a substrate;
    an angular velocity detection element having a vibrating body disposed in the substrate so as to be vibrated in first and second axial directions out of three axial directions corresponding to three axes disposed at right angles to each other, a driving element arranged to vibrate the vibrating body in the first axial direction by a drive signal, and a displacement detecting element arranged to detect displacement in the second axial direction of the vibrating body and output a detection signal when an angular velocity is applied around the third axis while the vibrating body is vibrated in the first axial direction;

drive wiring disposed in the substrate and connected to the driving element of the angular velocity detection element;

detection wiring disposed in the substrate and connected to the displacement detecting element of the angular velocity detection element; and a signal processing element disposed in the substrate and connected to the drive wiring and the detection wiring; wherein the substrate is a multilayer substrate including a plurality of insulation layers;

the detection wiring is disposed between two of the plurality of insulation layers inside the multilayer substrate;

low-impedance wiring having a low impedance facing the detection wiring is disposed at a location different from the detection wiring in the thickness direction of the multilayer substrate therein;

the angular velocity detection element includes an element-side drive electrode connected to the driving element, an element-side detection electrode connected to the displacement detecting element, and an element-side low-impedance electrode enclosing one of the element-side drive electrode or the element-side detection electrode arranged to cut off the coupling between the element-side drive electrode and the element-side detection electrode located on the mounting surface side to the multilayer substrate;

on the top surface of the multilayer substrate, a substrate-side drive electrode connected to the drive wiring and facing the element-side drive electrode, a substrate-side detection electrode connected to the detection wiring and facing the element-side detection electrode, and a substrate-side low-impedance electrode enclosing one of the substrate-side drive electrode or the substrate-side detection electrode arranged to cut off the coupling between the substrate-side drive electrode and the substrate-side detection electrode are provided;

the angular velocity detection element is mounted on the top surface of the multilayer substrate via metal bumps;

the element-side drive electrode and the substrate-side drive electrode are connected via metal bumps;

the element-side detection electrode and the substrate-side detection electrode are connected via metal bumps;

the element-side low-impedance electrode and the substrate-side low-impedance electrode are connected at a low-impedance reference potential; and the element-side low-impedance electrode and the substrate-side low-impedance electrode are arranged to at least partially face each other between the element-side drive electrode and the element-side detection electrode.

12. The angular velocity measuring device according to claim 11, wherein an opposite portion, in which the element-side low-impedance electrode and the substrate-side low-impedance electrode face each other, encloses the element-side detection electrode and the substrate-side detection electrode.

13. The angular velocity measuring device according to claim 11, wherein the multilayer substrate includes three insulation layers.

14. The angular velocity measuring device according to claim 11, wherein the multilayer substrate includes four insulation layers.

15. The angular velocity measuring device according to claim 11, wherein the element-side drive electrode is island-shaped.

16. The angular velocity measuring device according to claim 11, wherein the element-side detection electrode is island-shaped.

17. The angular velocity measuring device according to claim 11, wherein the element-side detection electrode is disposed in a central portion of mounting surface side of the multilayer substrate.

18. The angular velocity measuring device according to claim 11, wherein the substrate-side detection electrode is island-shaped.

19. The angular velocity measuring device according to claim 11, wherein the substrate-side low-impedance electrode is defined by a ground electrode that substantially covers an entire portion of the substrate that faces the angular velocity detection element, except at locations at which the substrate-side drive electrode and the substrate-side detection electrode are disposed.

20. The angular velocity measuring device according to claim 11, wherein the substrate-side detection electrode is disposed in a central portion of the substrate.

* * * * *